(12) United States Patent
Lawson et al.

(10) Patent No.: US 6,625,929 B1
(45) Date of Patent: Sep. 30, 2003

(54) ARRANGEMENT FOR COVERING PLANT CONTAINER

(75) Inventors: Trevor Lawson, East Grinstead (GB); Kenneth Freeman, Burgess Hill (GB); Mike Lothian, East Grinstead (GB); Mike Best, Totton (GB)

(73) Assignee: Rentokil Initial UK Limited, West Sussex (GB)

( * ) Notice: Subject to any disclaimer, the term of this patent is extended or adjusted under 35 U.S.C. 154(b) by 0 days.

(21) Appl. No.: 09/856,776

(22) PCT Filed: Nov. 25, 1999

(86) PCT No.: PCT/GB99/03918

§ 371 (c)(1),
(2), (4) Date: May 25, 2001

(87) PCT Pub. No.: WO00/30507

PCT Pub. Date: Jun. 2, 2000

(30) Foreign Application Priority Data

Nov. 25, 1998 (GB) ............................................. 98258437

(51) Int. Cl.⁷ ............................... A47G 7/08; A01G 9/02
(52) U.S. Cl. ............................... 47/72; 47/66.1; 47/86
(58) Field of Search ................................ 47/72, 86, 65.9, 47/66.1; 206/423; 220/4.01, 4.04, 4.08, 4.28, 4.33

(56) References Cited

U.S. PATENT DOCUMENTS

| | | | | | |
|---|---|---|---|---|---|
| 2,567,706 | A | * | 9/1951 | Hannum et al. | 229/5.81 |
| 3,966,285 | A | * | 6/1976 | Porch et al. | 312/265.4 |
| 4,120,119 | A | * | 10/1978 | Engel | 220/4.26 |
| 4,170,301 | A | * | 10/1979 | Jones et al. | 206/423 |
| 4,212,134 | A | * | 7/1980 | Brokamp | 47/82 |
| 4,738,371 | A | * | 4/1988 | Wakeman | 217/43 A |
| 4,753,036 | A | * | 6/1988 | Konno | 47/59 R |
| 4,807,808 | A | * | 2/1989 | Reed | 229/103 |
| 5,056,198 | A | * | 10/1991 | Viglione | 211/70.2 |
| 5,427,240 | A | * | 6/1995 | Holtkamp, Jr. | 206/423 |
| 5,613,320 | A | * | 3/1997 | Thomasson et al. | 47/29.1 |

FOREIGN PATENT DOCUMENTS

| | | |
|---|---|---|
| CH | 662 241 A5 | 9/1987 |
| DE | 32 24 297 C1 | 11/1983 |
| DE | 296 08 920 U1 | 8/1996 |
| FR | 472 375 A | 12/1914 |
| JP | 3-151915 | * 6/1991 |
| JP | 9-135762 | * 5/1997 |
| JP | 11-206536 | * 8/1999 |
| JP | 2000-325200 | * 11/2000 |

* cited by examiner

*Primary Examiner*—Peter M. Poon
*Assistant Examiner*—Jeffrey L. Gellner
(74) *Attorney, Agent, or Firm*—Young & Thompson

(57) ABSTRACT

A plant container apparatus (610) includes an arrangement (616, 618) for at least partially covering at least one plant container (612) and in which the arrangement (616, 618) is modular in form. In particular, the modular covering arrangement comprises a plurality of appropriately shaped panels (616) which are arranged to be secured together and secured to the plant containers (612) by securing straps (618). In one particular embodiment, the securing straps (618) are arranged to engage with side regions of the panels (616) and to be secured by securing devices such as screw fixtures (120) to upper and lower portions of the plant containers (612). A particularly versatile and readily adjustable and reconfigurable plant container cover arrangement can thereby be provided.

25 Claims, 28 Drawing Sheets

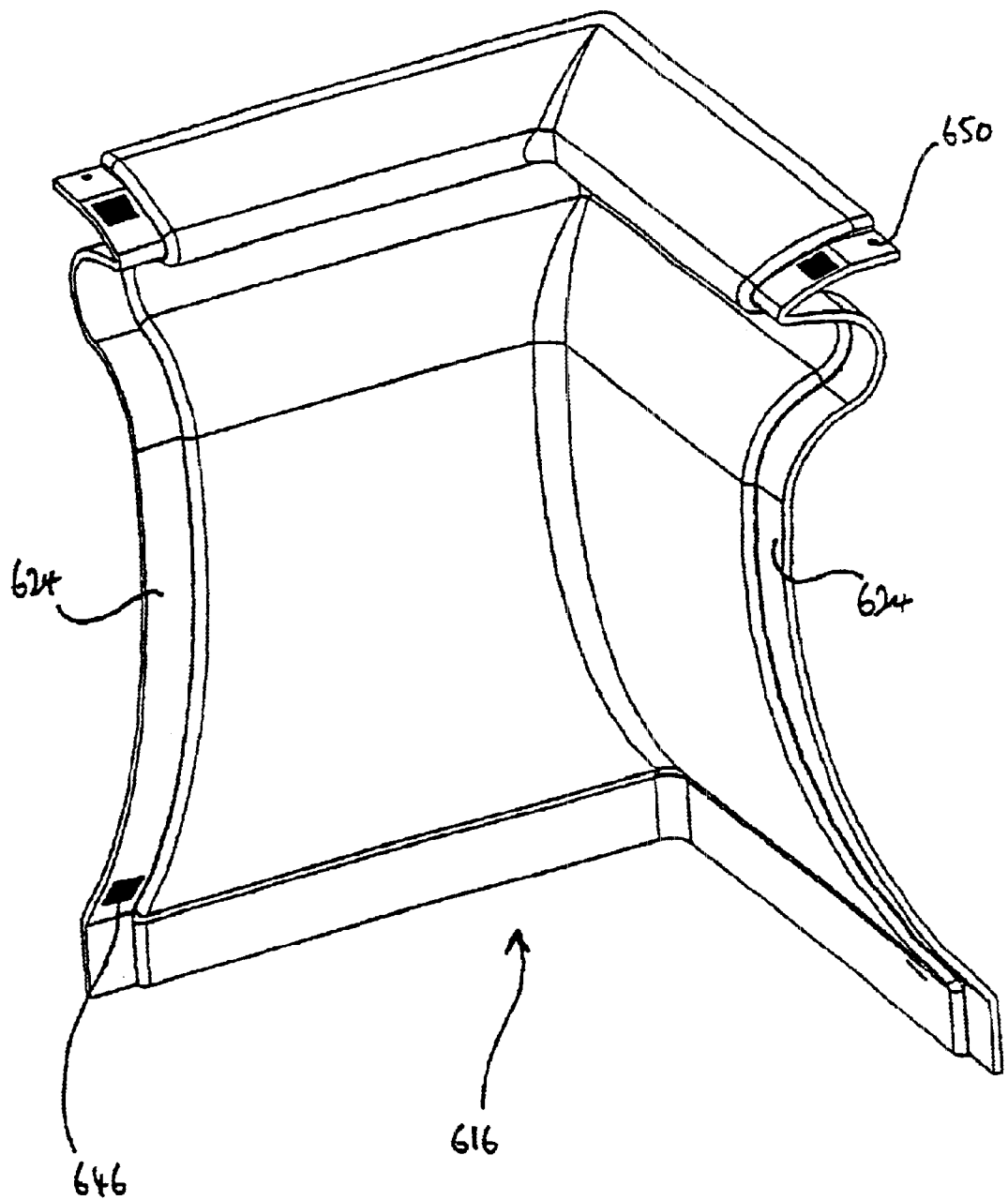

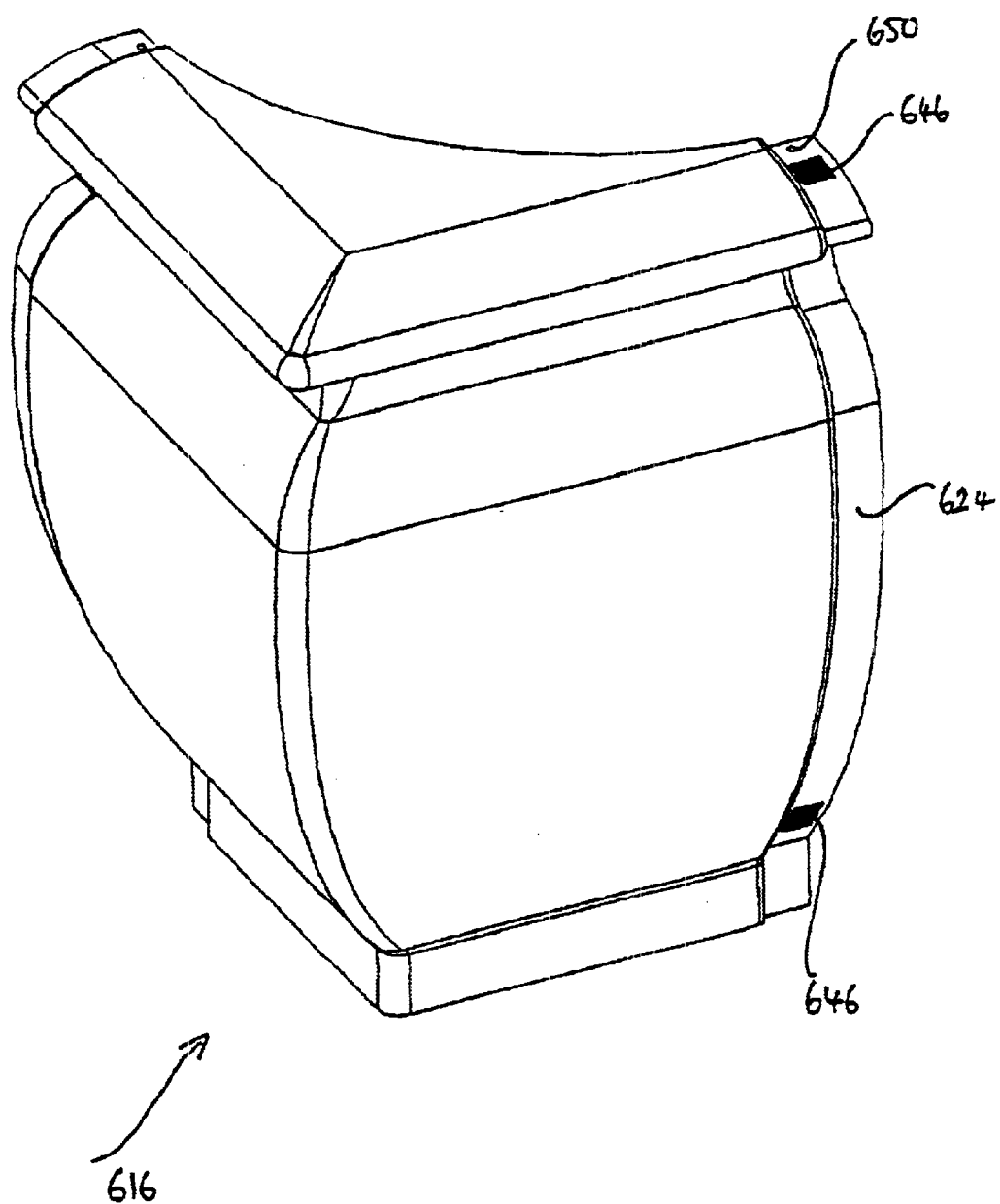

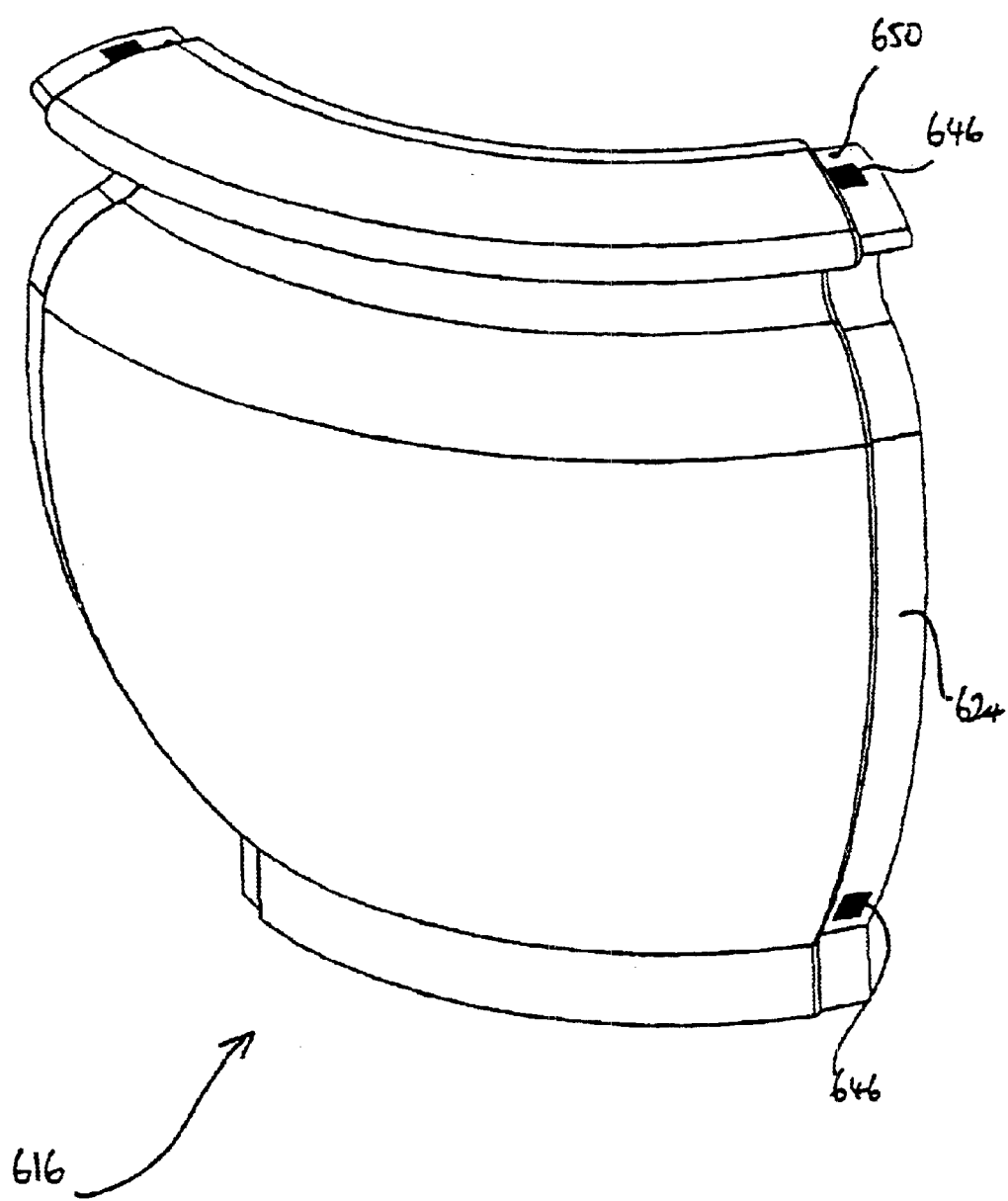

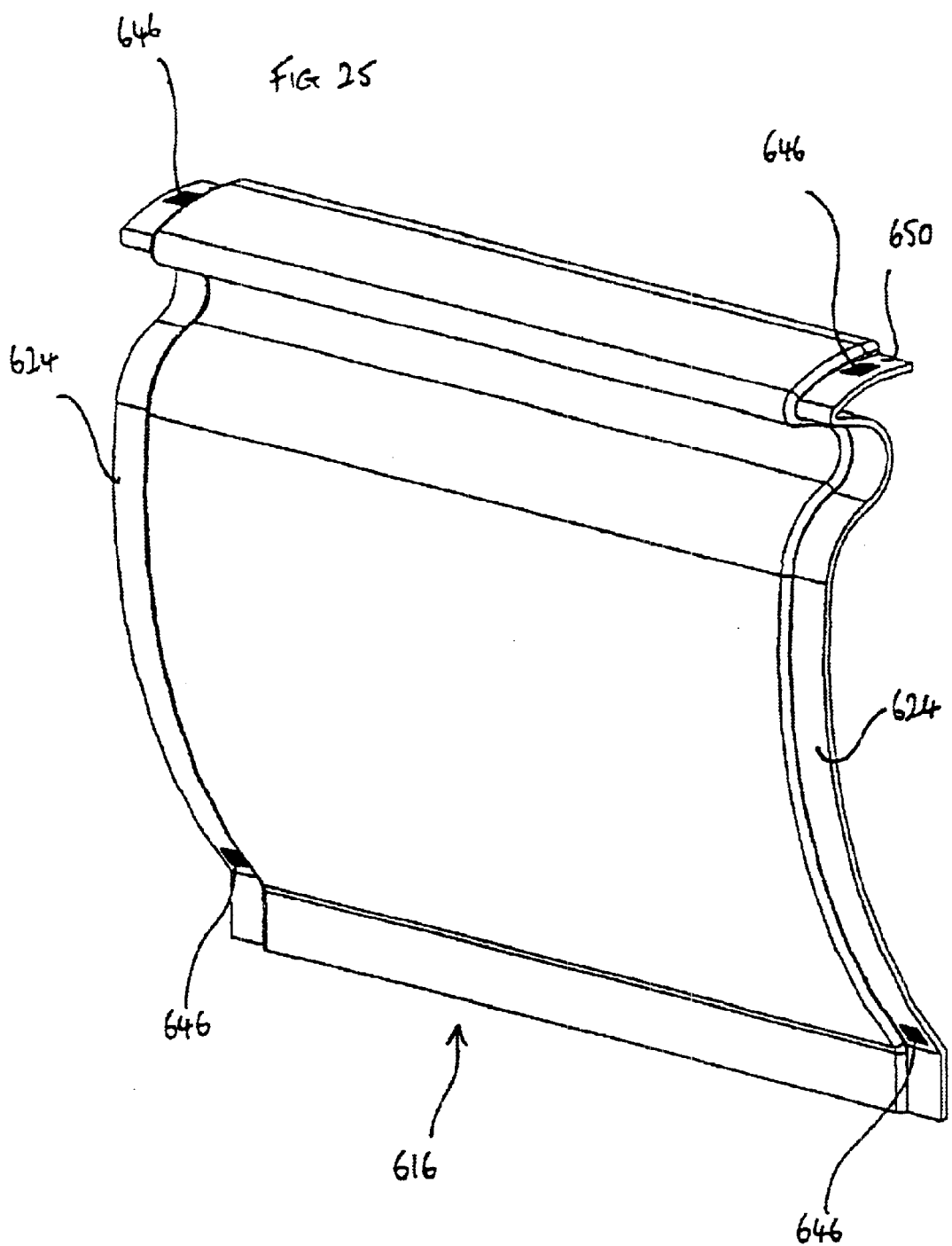

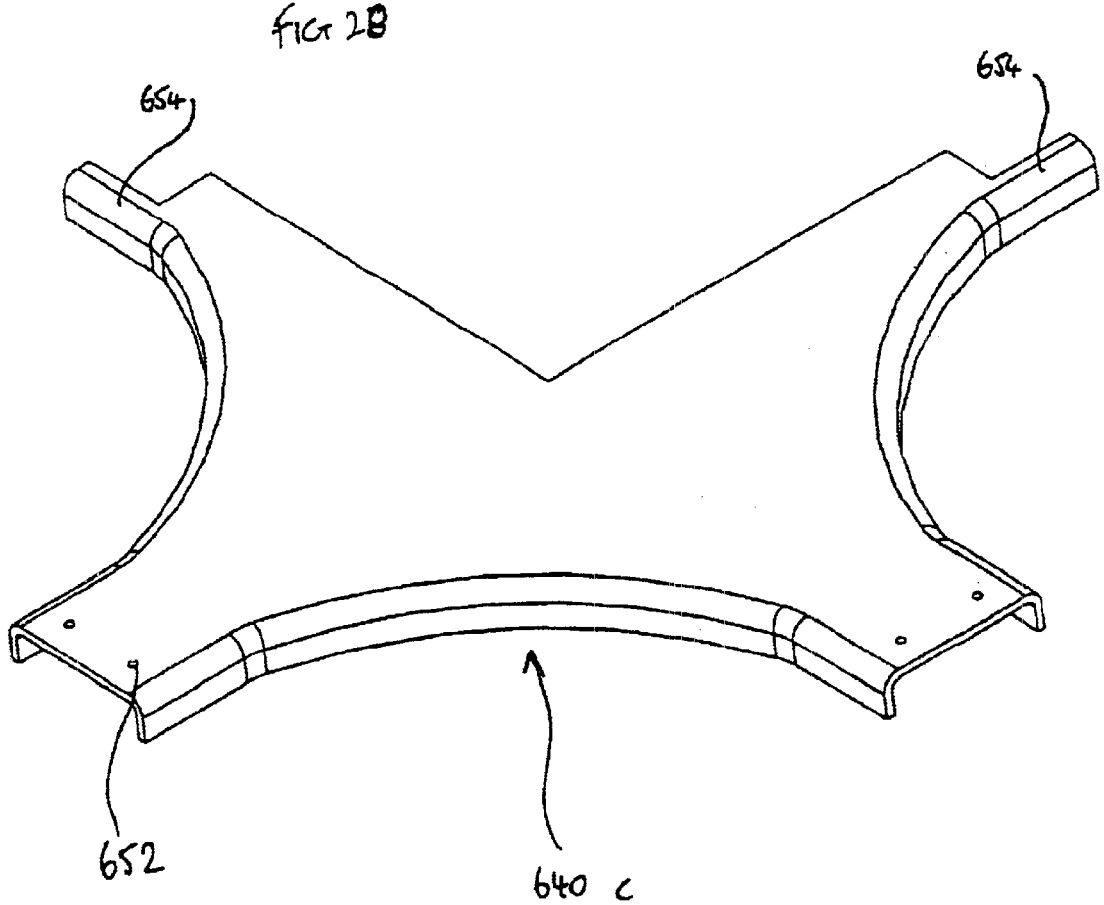

ARRANGEMENT FOR COVERING PLANT CONTAINER

BACKGROUND OF THE INVENTION

The present invention relates to an arrangement for providing at least partial cover for a plant container and also a plant container cover and a plant container apparatus including such a cover.

DESCRIPTION OF THE RELATED ART

A wide variety of containers for receiving plants, and in particular indoor plants, are already known and include those in which aesthetic qualities are taken into account such that the plant container is formed of a potentially attractive material and is intended to have an attractive outer appearance, and those, such as cheap mass produced plastic plant pots, that have little if no aesthetic qualities and are quite often intended merely to form an inner liner pot for a more attractive outer pot.

However, such outer pots, and indeed the more expensive containers that also exhibit the aforementioned aesthetic qualities are disadvantageously limited as regards the size of container that can be provided and also as regards the limited use that such containers can find. For example, since the containers, or outer containers for having aesthetic qualities are produced to predefined dimensions their usefulness is restricted to environments requiring a container of such exact dimensions and appearance.

It has been known to try and enhance the aesthetic appearance of the standard mass produced plastic plant pot by forming a decorative sleeve that can be placed around the plant pot and such an arrangement is disclosed in UK Patent Application GB 2 213 693 A.

However, such known arrangements are disadvantageously limited in the nature of the aesthetic qualities that can be presented and are also disadvantageously limited as regards the general shape and configuration of the plant pot whose appearance is to be improved.

SUMMARY OF THE INVENTION

The present invention seeks to provide for an arrangement for at least partially covering a plan pot container and having advantages over and above such known arrangements.

According to one aspect of the present invention, there is provided an arrangement for at least partially covering plant containing means to thereby at least partially surround the said containing means, comprising a modular arrangement including a plurality of panel members and means for securing the said plurality of panel members relative to each other so as to provide for said at least partial covering of the containing means.

Advantageously, in presenting the plant container cover in a modular form, a wide variety of covers of different overall size, shape and dimensions can be provided so as to afford decorative cover to a plant containing system that can have one of a wide variety of forms. Also, the arrangement of the present invention can be used so as to provide at least partial coverage for a plurality of plant containers so that, once covered by the arrangement of the present invention, the overall appearance is of one large container which can have any shape or size dependent upon the requirements of the environment in which it is to be located.

Preferably, the means for securing the said panels can comprise a strap member arranged to overlap with adjacent panel members.

In this manner, the strap member can be arranged for engagement with engagement formations of the said panel members.

Advantageously, the said plurality of panel members can comprise at least two or more of a straight panel portion, a corner panel portion, a half circle panel portion or a quarter circle panel portion.

In one embodiment, the side edges of the said plurality of panel members can include engagement formations.

Preferably, the arrangement can include means for securing said plurality of panel members to the plant containing means.

The said plurality of panels can be arranged to present the said means for securing the said panels to the plant containing means.

Advantageously, the arrangement can include hook and eye fastener means so as to provide for a temporary location of said plurality of panels relative to the plant containing means.

In a particular embodiment, the means for securing the said plurality of panels to the plant containing means can comprise a strap member.

Further, the two ends of the strap member can be arranged for engagement with an upper and lower portion of the plant containing means respectively.

Preferably, the means for securing the said panels relative to each other can also comprise the said means for securing the said panels to the plant containing means.

An advantageously simple but effective arrangement can thereby be provided.

The arrangement can include a strap member for connection to both the said panels and the plant containing means.

According to a further aspect of the present invention, there is provided a plant containing means cover formed of an arrangement as defined above.

Also, the present invention provides for a plant containing apparatus comprising a plant containing means as defined above and wherein the said plant containing means includes at least one plant container.

Preferably, the said at least one plant container includes a joggled profile around an upper rim thereof.

Also, a portion of the rim of the plant container forming the joggled profile can comprise an engagement formation for the securing of the said plurality of panel members to at least one plant container.

Advantageously, the region forming the joggled profile can serve to locate the said plurality of panels relative to the at least one plant container.

In one embodiment, the plant container apparatus can include a plurality of foot members upon which the plant container is to be located and arranged for engagement with a portion of the container defining the joggled profile so as to assist in the location of each of the said feet.

The joggled profile can then extend down the side of the plant container in the form of a rib.

DEBRIEF DESCRIPTION OF THE DRAWINGS

The invention is described further hereinafter, by way of example only, with reference to the accompanying drawings in which:

FIGS. 22–25 are perspective views of different forms of panel member as illustrated in the sixth embodiment; and FIGS. 26–28 are perspective views of cover-plate members found in the aforementioned sixth embodiment.

DESCRIPTION OF THE PREFERRED EMBODIMENTS

Figure 1:
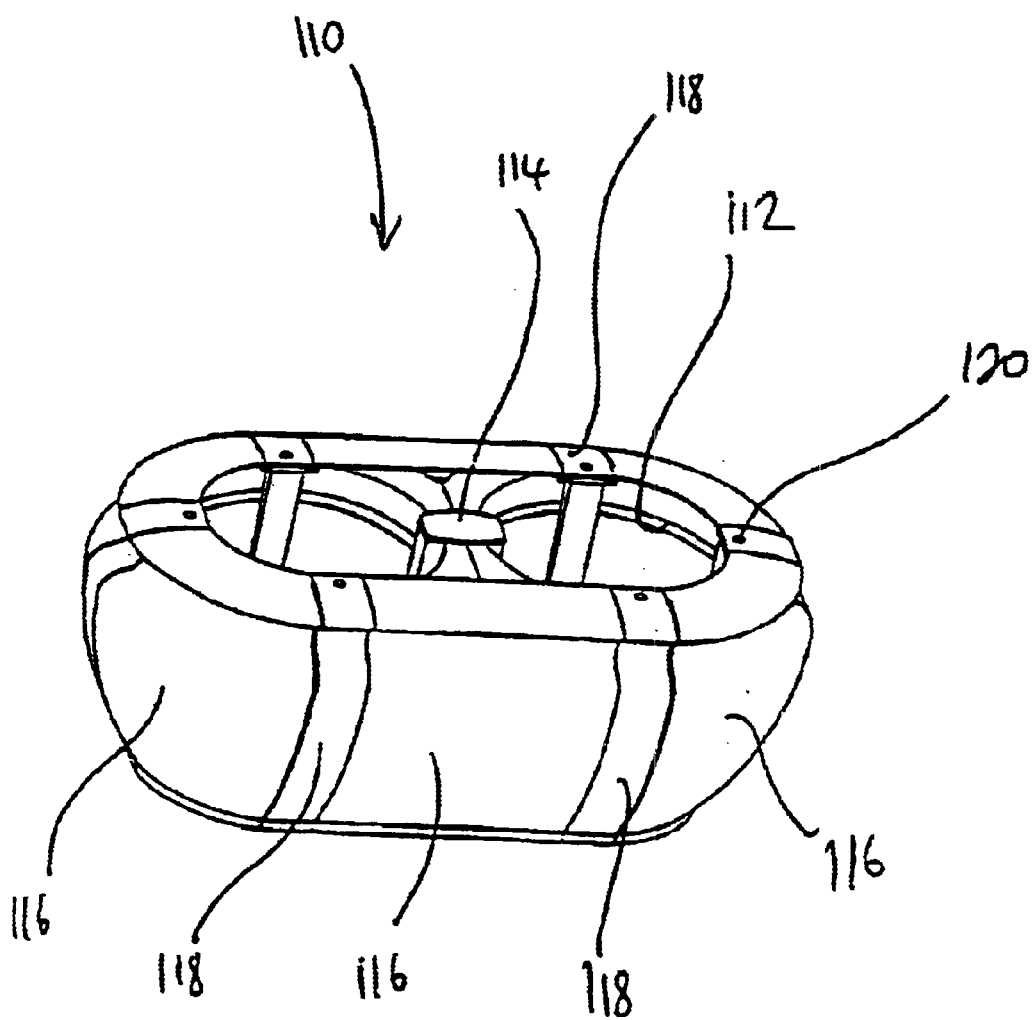
FIG. 1 is a perspective view of a plant container apparatus in accordance with the first embodiment of the present invention.

FIG. 1 illustrates the first embodiment of the present invention comprising a plant container apparatus 110 which includes a modular cover arrangement for use in association with two plant pots 112.

A locking plate 114 is employed to secure the two plant pots 112 in appropriate mutual registration and a plurality of panel members 116 are then secured relative to one another and to the plant pots 112 by means of securing strap members 118. The securing strap members 118 engage with an upper flange portion of the plant pots 112 by means of screw members 120.

Figure 2:
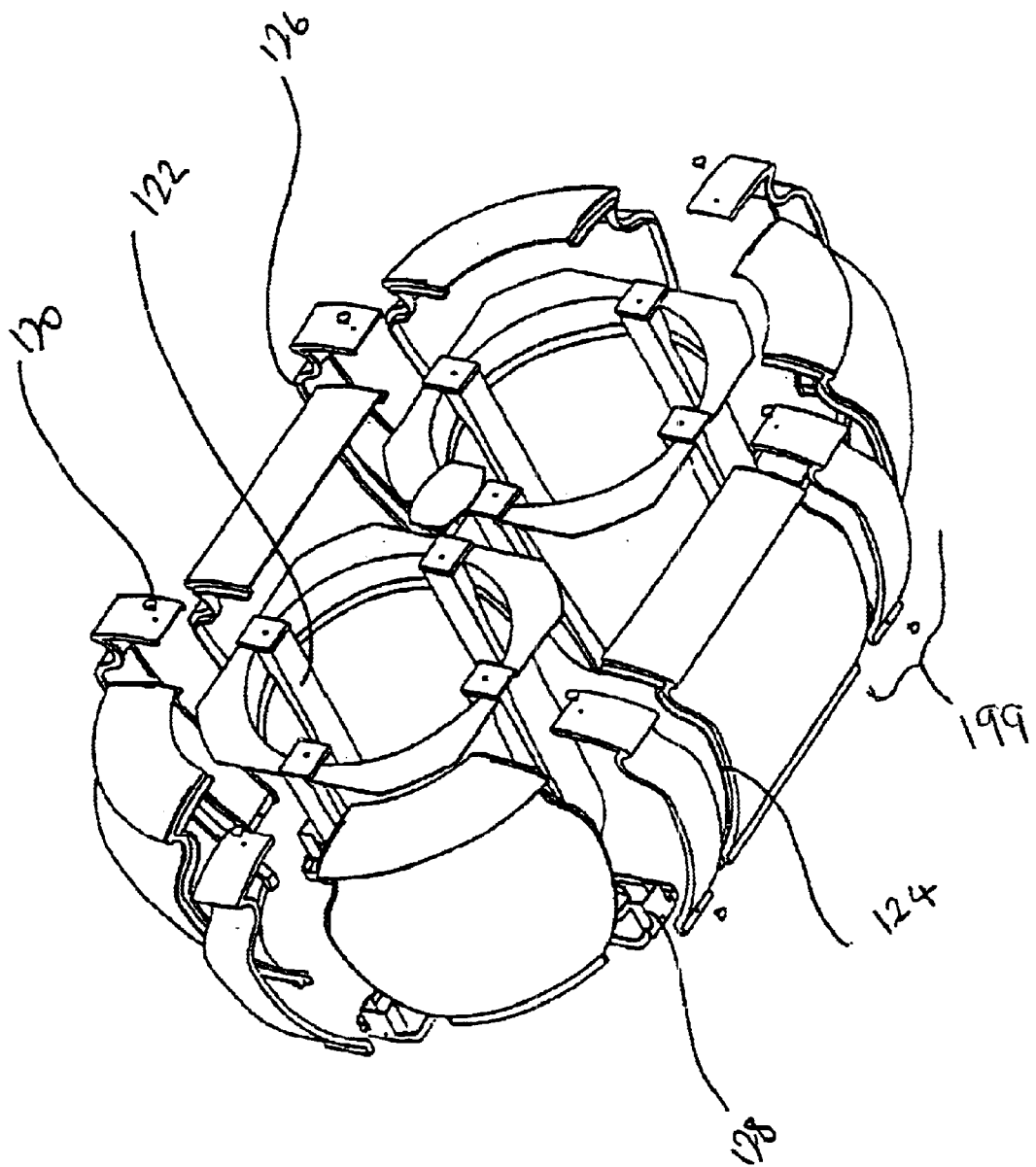
FIG. 2 is an exploded view of the apparatus of FIG. 1.

FIG. 2 shows the various elements of the apparatus of FIG. 1 in greater detail and represents an exploded view of FIG. 1.

As will be appreciated, each of the plant pots 112 include joggled profiles 122 which extend the full depth of the plant pots 112. The joggled portions serve to provide for ready location of the panels 116 and the straps 118 and also serve to stiffen the plant pots 112 and this enhances the rigidity thereof. The straps are preformed with a profile similar to that of the panels.

As can also be seen from FIG. 2, the side edges of the panels 116 have joggled edges and foot members 128 are also provided upon which the pots 112 sit and to which lower regions of the straps 118 are secured.

The side edges of the straps 118 are provided with flanges 126 which engage with the joggled edges 124 of the panels 116. The attachment of a strap 118 to two adjacent panels 116 form a joint 199 between the adjacent panels.

Figure 3:
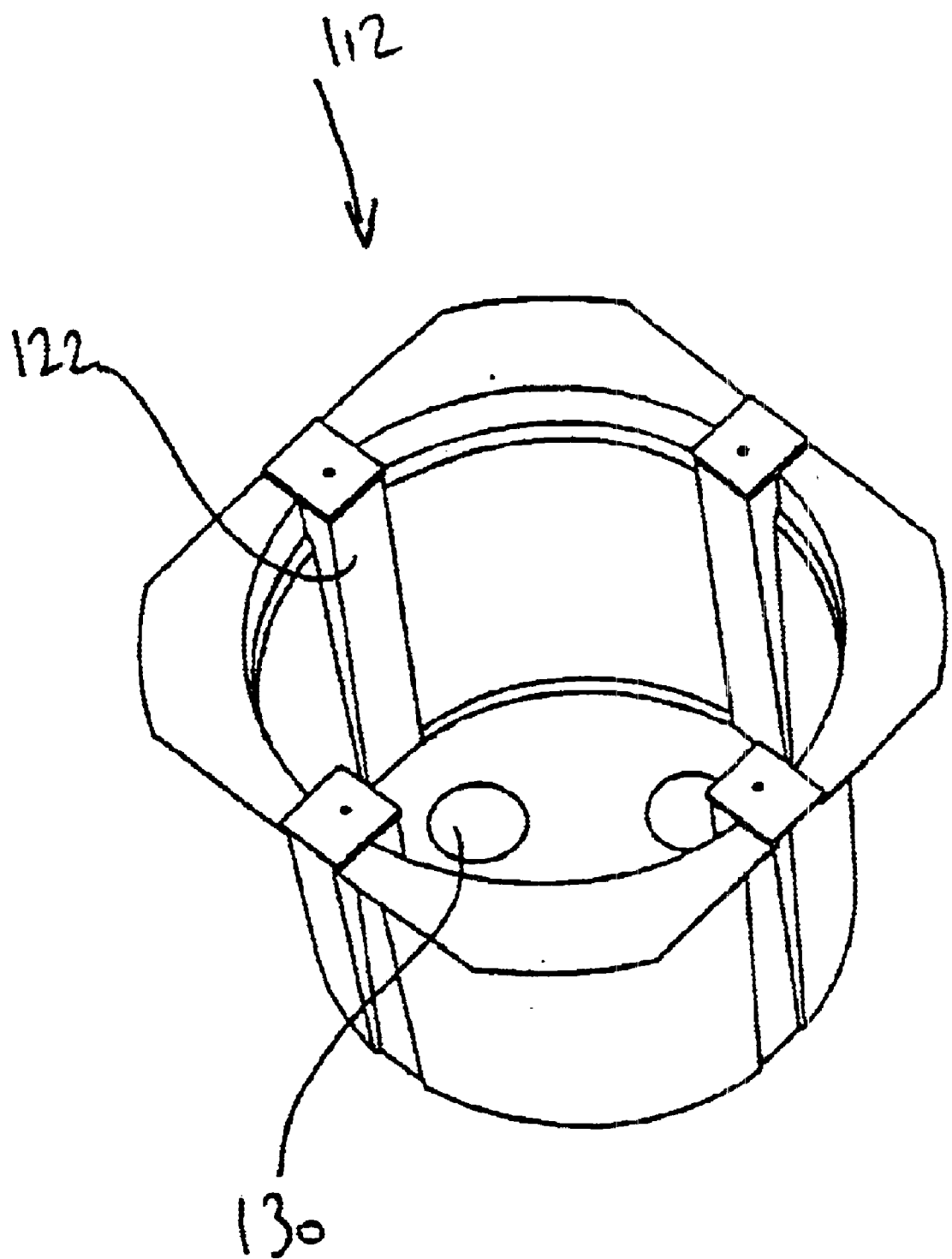
FIG. 3 is a perspective view of a plant container for use in the apparatus of FIG. 1.

In FIG. 3, there is shown a perspective view of a plant pot 112 as employed within FIG. 1 and in which the joggled profiles 122 are clearly visible. Also visible are two of four part-spherical depressions 130 which, on the undersurface of the plant pot 112 serve to form part spherical engagement formations.

Figure 4:
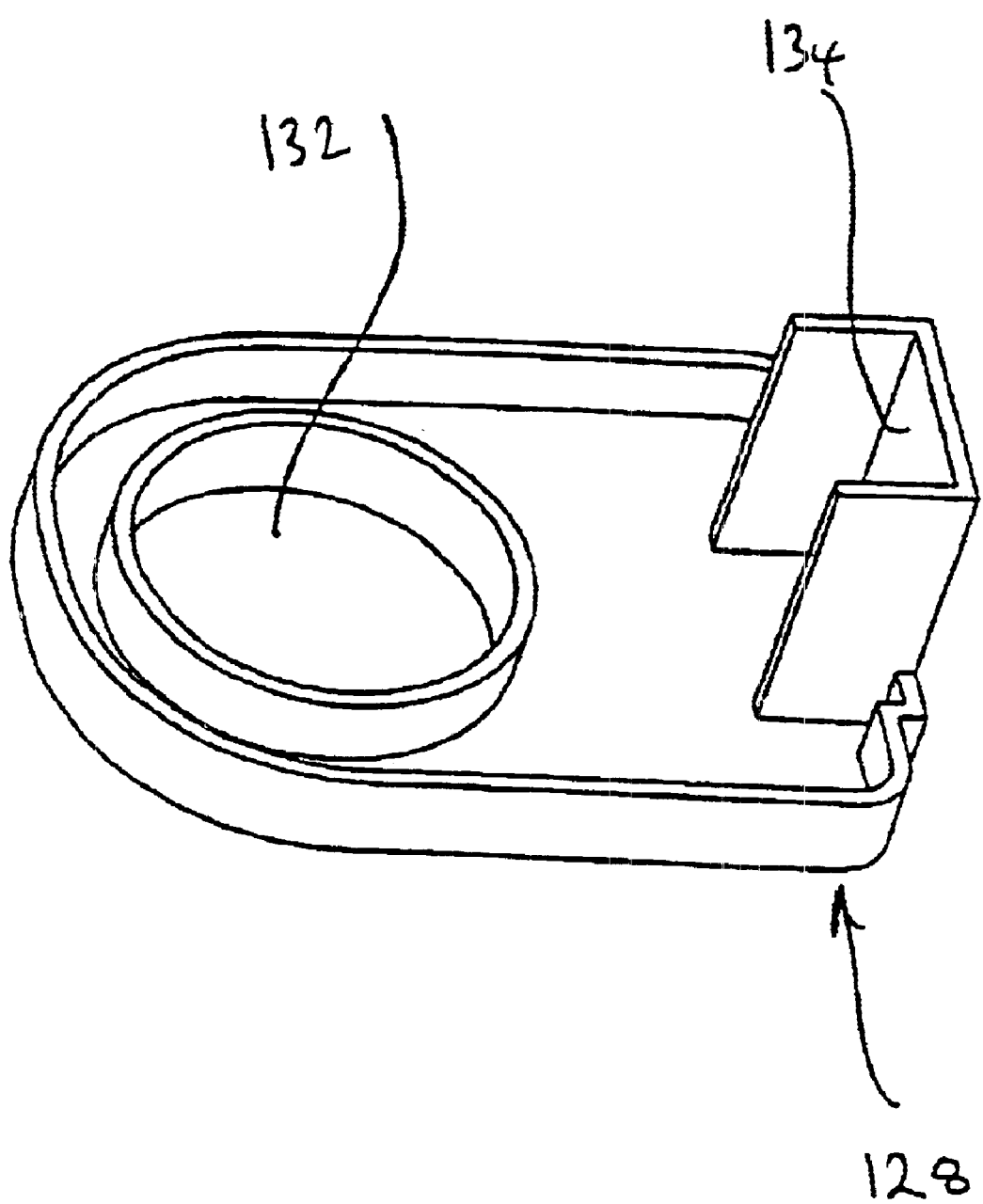
FIG. 4 is a perspective view of a foot for the plant container of FIG. 3.

The part-spherical engagement formations are arranged to engage with respective foot members 128 as illustrated in FIG. 4. Each foot member (128)includes a circular opening 132 for receiving the said engagement formation. Also included within each foot member 128 is an upstanding channel member 134 which is arranged to engage within the lower portion of each respective joggled profile 122 of the plant pot 112. The engagement between the joggled profile 122 and the channel member 134 serves to accurately locate and orientate each foot member 128 relative to the plant pot 112 which can prove to be an important feature particularly when the strap 118 is arranged to be connected to the foot member 128.

Figure 5:
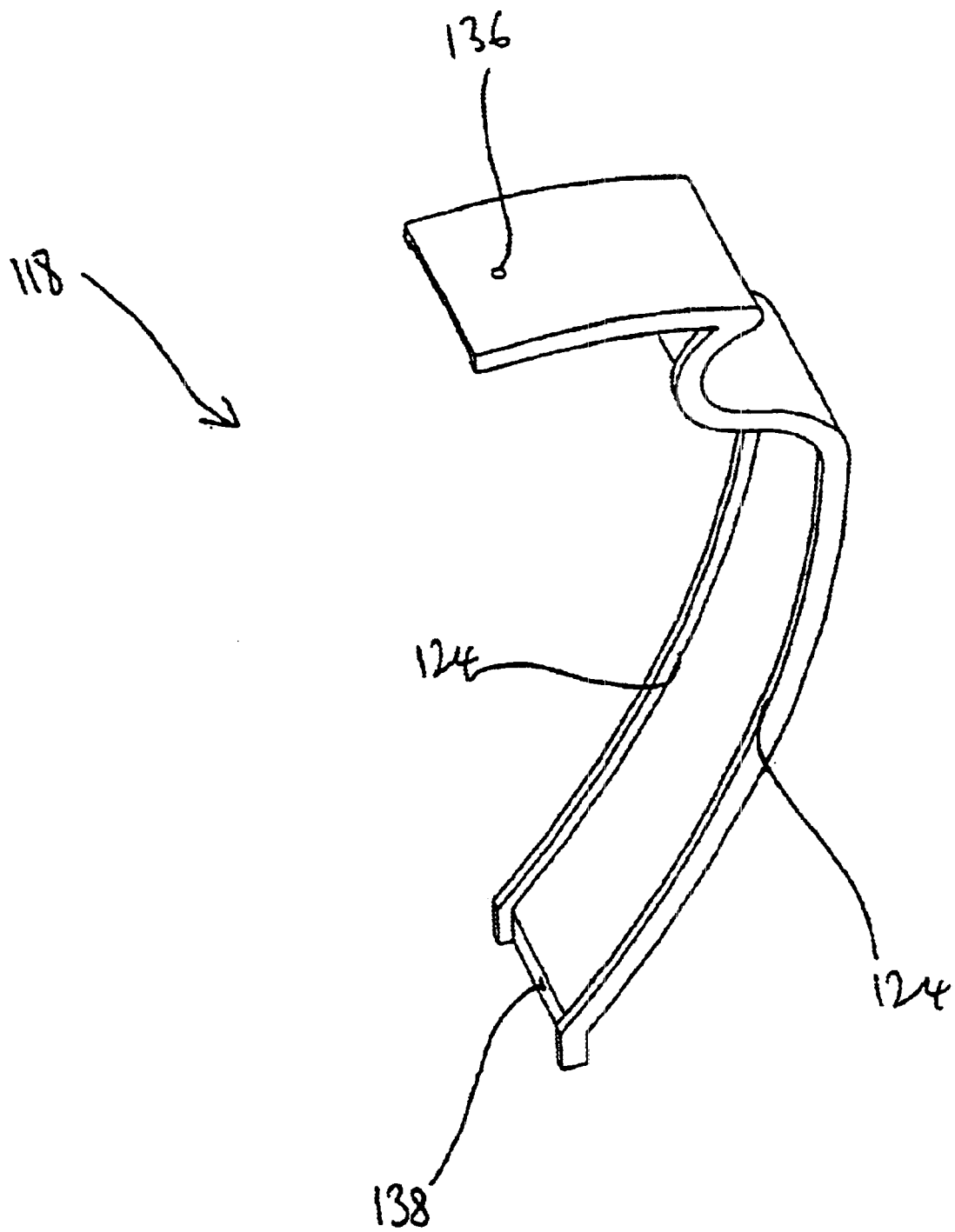
FIG. 5 is a perspective view of a securing strap member according to the embodiment of FIG. 1.

The securing strap of the embodiment of FIG. 1 is shown in greater detail and in perspective in FIG. 5 wherein the side flanges 124 are clearly visible as are apertures 136 and 138 in the upper and lower regions of the strap member 118 and which serve to receive the screw members 120 so as to allow for securing of the strap 118 to the plant pots 112.

Figure 6:
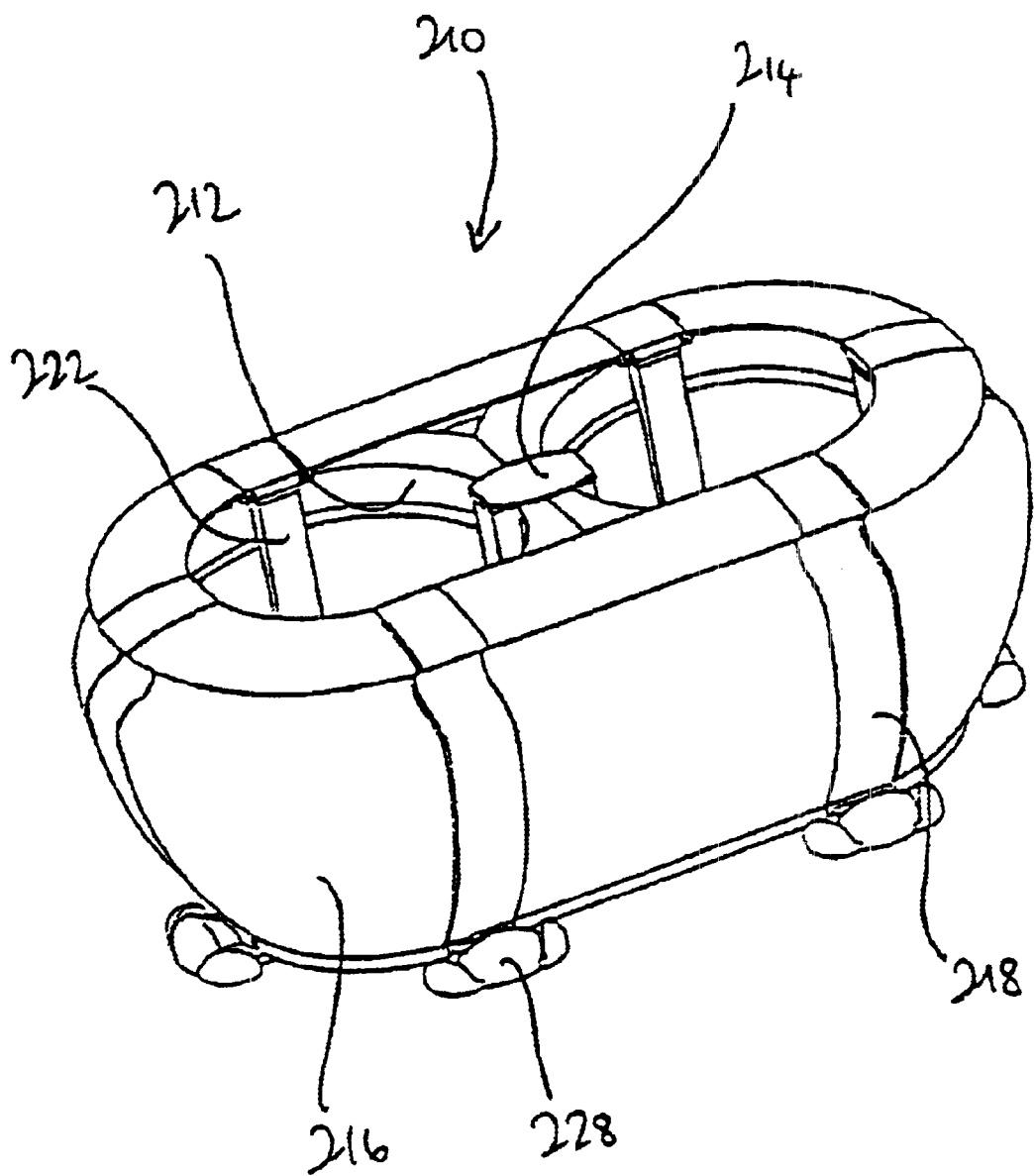
FIG. 6 is a perspective view of a plant container apparatus in accordance with the second embodiment of the present invention.

A second embodiment of the present invention is illustrated in FIG. 6 and includes a plant containing apparatus 210 again having two pots 212 connected by means of a locking plate 214 and surrounded by a cover arrangement comprising a plurality of panels 216 secured by means of securing straps 218. Each of the pots 212 includes a plurality of regions presenting a joggled profile 222 and a plurality of feet 228 are provided for supporting the apparatus above the ground and also for engagement with the securing straps 218.

Figure 7:
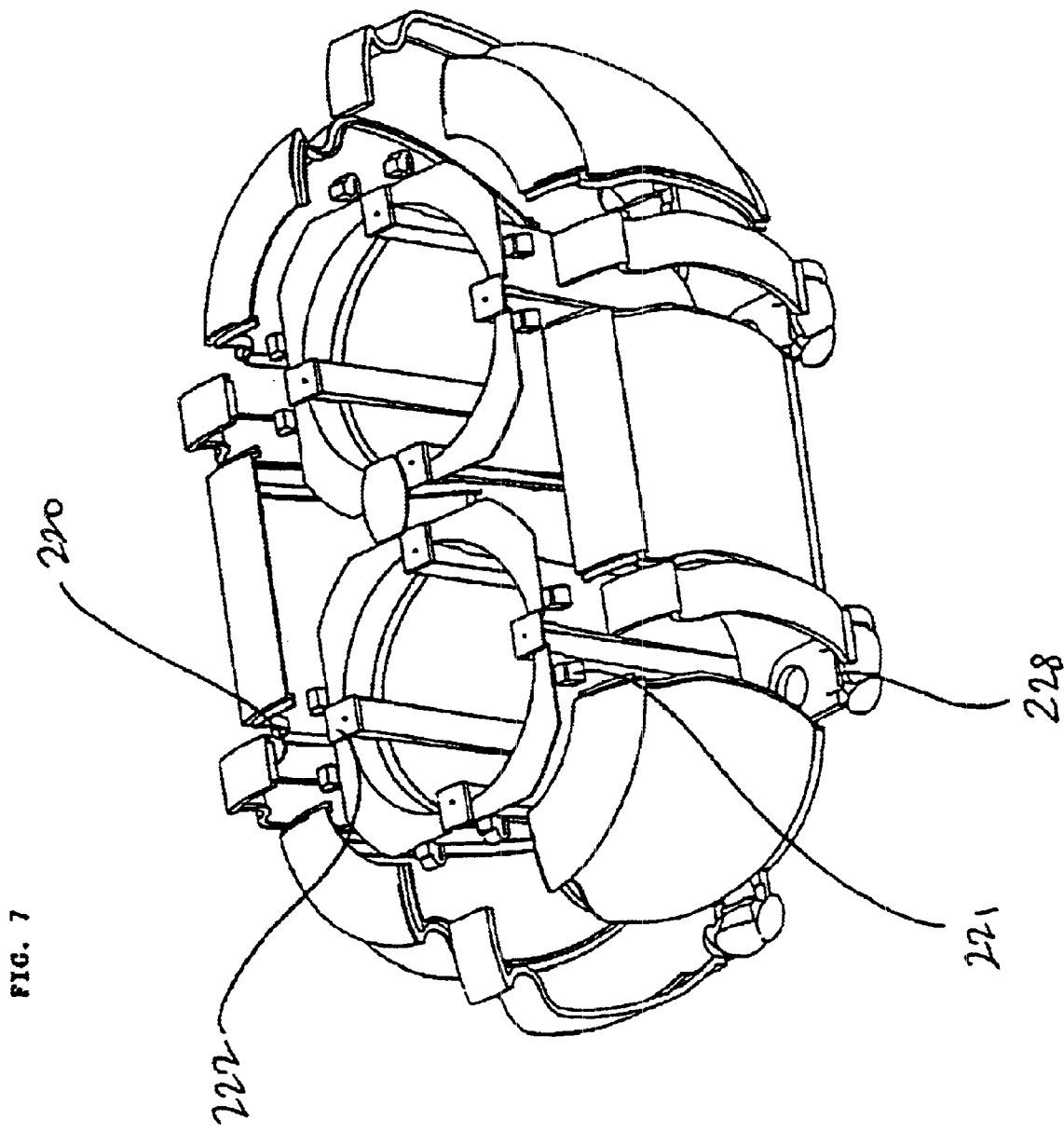
FIG. 7 is an exploded view of the apparatus of View FIG. 6.

In FIG. 7, the embodiment of FIG. 6 is shown in greater detail and it can be seen that the upper end of each of the straps 218 is provided with a downwardly depending lip 220 which is arranged to engage over an upper land presented by the joggled profile 222.

Also included are a plurality of C-section extrusion pieces 221 which can be bonded to the undersurface of the upper region of the panels 216 and which serve to engage with an upper flange of the plant pot. As with all embodiments of the present invention in which the plant pots present at least one joggled profile, the joggled profile can advantageously serve to locate, and at least partially secure, the plurality of panel members.

Figure 8:
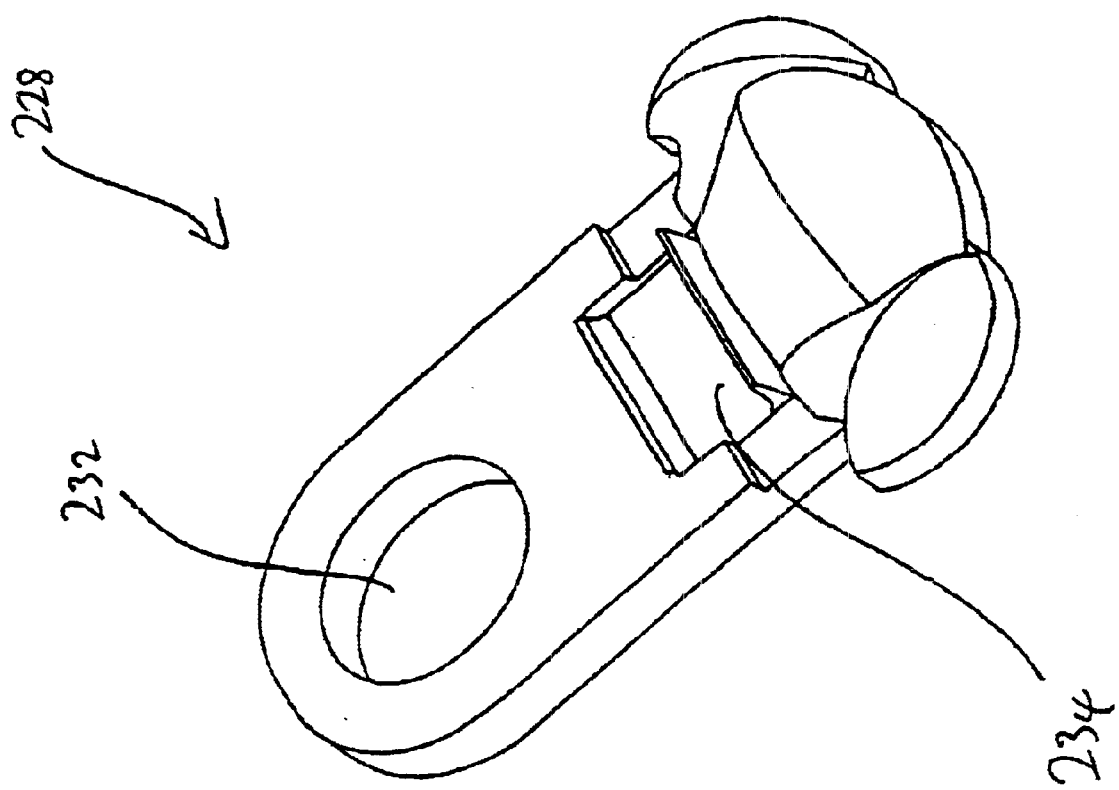
FIG. 8 is a perspective view of a foot for the plant container of the embodiment of FIG. 6.

FIG. 8 is a perspective view of a foot member 228 for use in the embodiment of FIG. 6 and 7 and which includes a circular aperture 232 for receiving the part spherical engagement formation formed on the undersurface of each plant pot 212.

Also formed on the foot member 228 is a press-fit clip member 234 which is arranged to receive the lower edge of the securing strap 218 of this embodiment.

Figure 9:
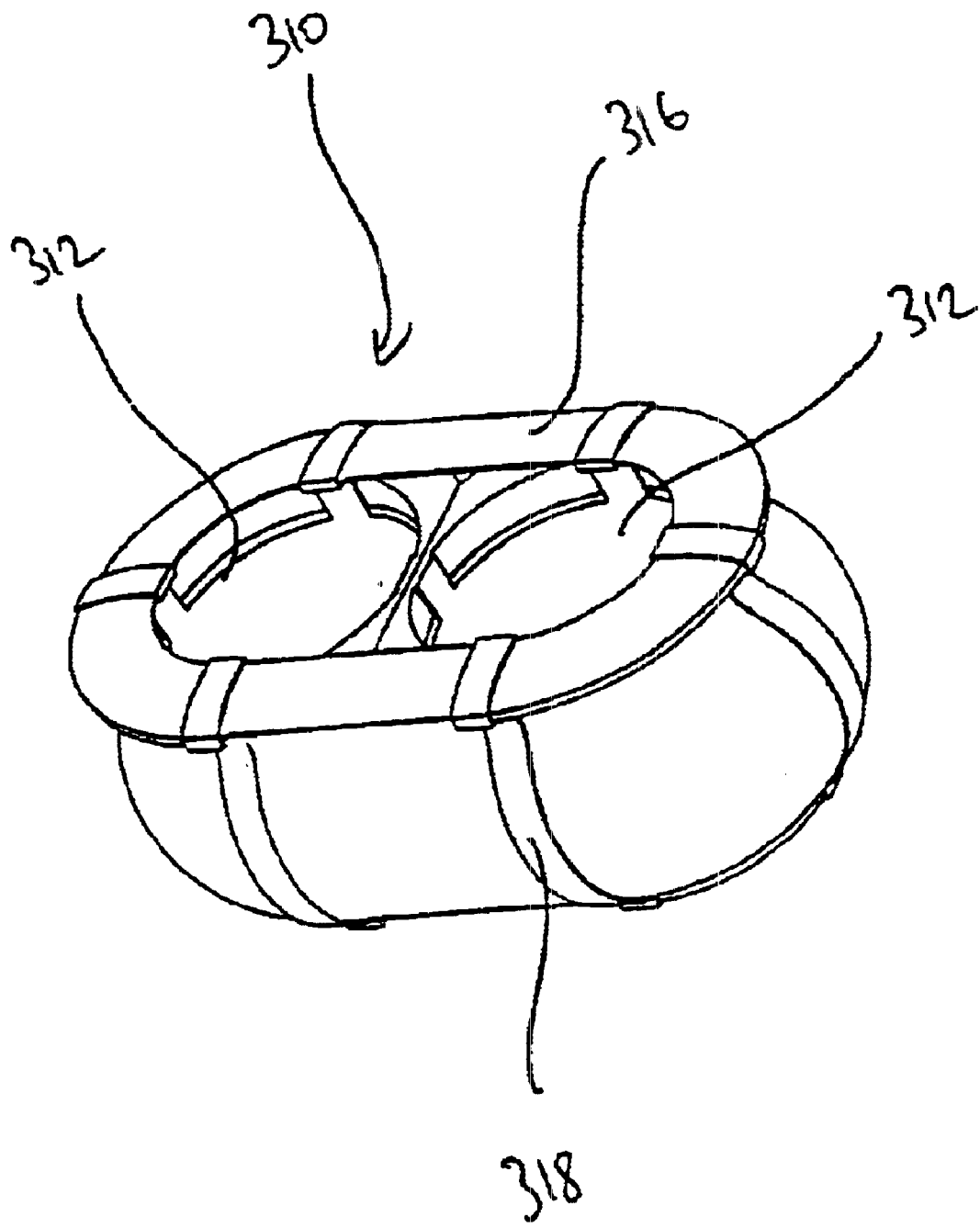
FIG. 9 is a perspective view of a plant container apparatus in accordance with the third embodiment of the present invention.

FIG. 9 is a perspective view of a yet further embodiment of the present invention comprising an apparatus 310 for containing plants and comprising two plant pots 312 surrounded by a cover arrangement comprising a plurality of panels 316 secured relative to each other and to the plant pots 312 by means of securing straps 318.

Figure 10:
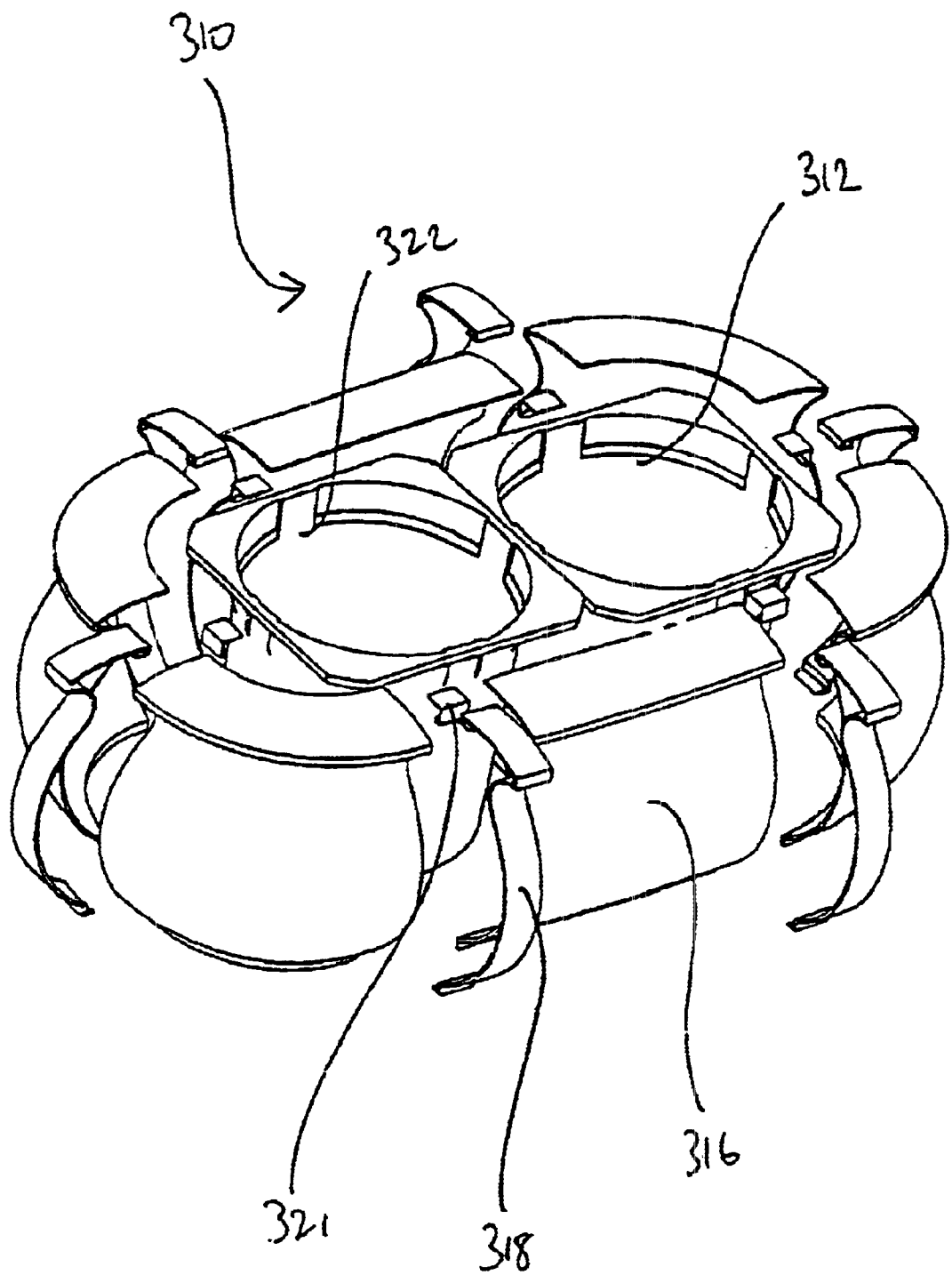
FIG. 10 is an exploded view of the apparatus of FIG. 9.

An exploded view of the embodiment of FIG. 9 is presented in FIG. 10 and clearly shows a plurality of panel locators 321 as employed within this embodiment.

Each of the panel locators 321 presents one surface of a hook and eye fastening system; the other surface of which is provided on the under side of the upper region of each of the panels. The locator 321 is secured to the upper flange of each plant pot 312 at the location of an upper joggled profile 322 and provides means by which the plurality of panels 316 can be, at least temporarily, located around the plant pots 312. Once appropriately located, the securing straps 318 are then employed to secure the panels together and to the plant pots 312. As can be seen in the illustration provided by FIG. 10 for this further embodiment of the present invention, the upper end of each securing strap 318 is turned around to form a clip portion which serves to engage around both the upper edge portion of each panel and the upper edge of the horizontal (as seen in FIG. 10) portion of the locator 321 so as to sandwich the said portion of the locator 321 and the edge of the upper region of each panel 316 together when securing the panels to the plant pots 312.

Figure 11:
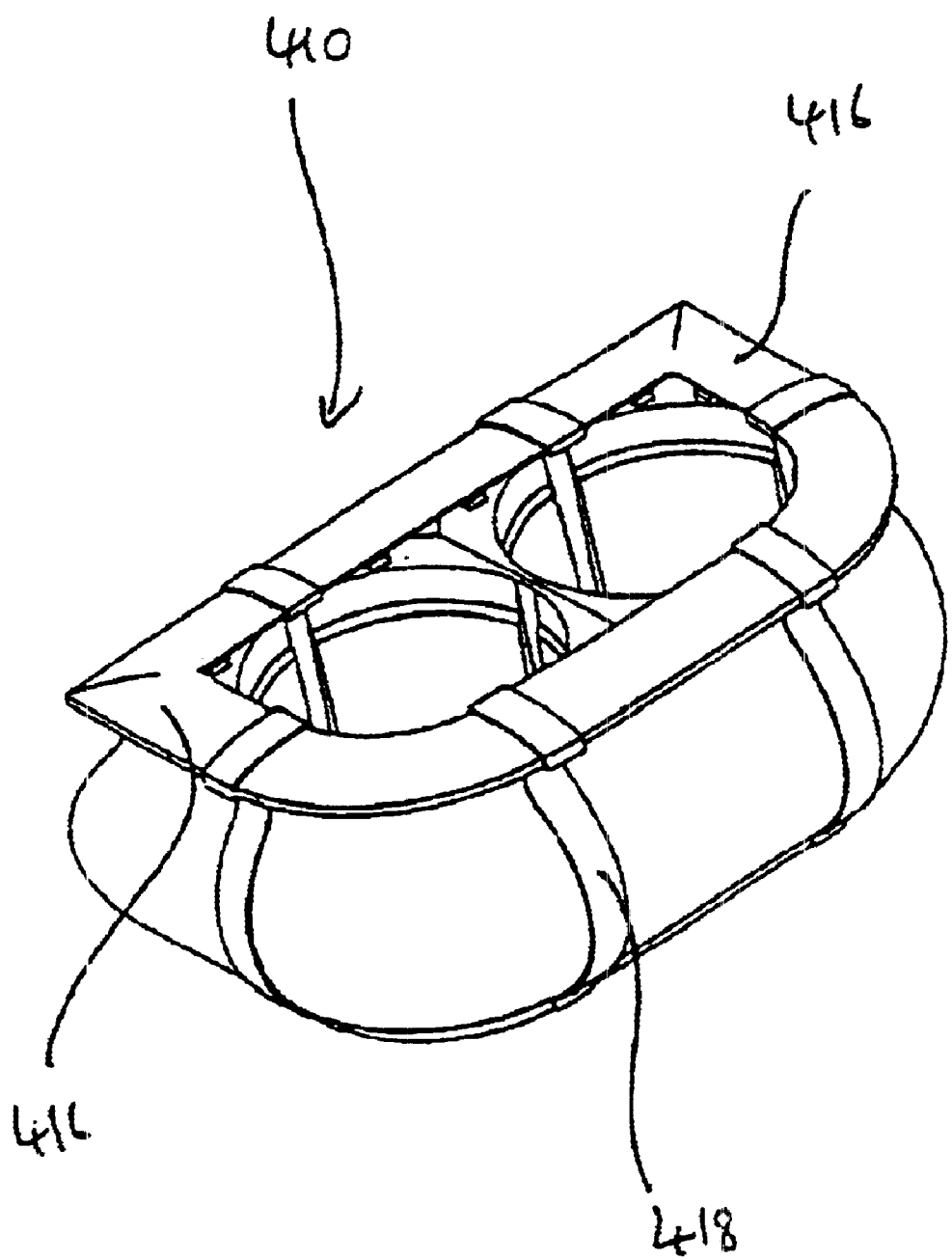
FIG. 11 is a perspective view of a plant container apparatus in accordance with the fourth embodiment of the present invention.

In the still further embodiment of FIG. 11, there is shown plant container apparatus 410 having a plurality of panels of which the identified panels 416 comprise corner panels and in which the cover arrangement includes a plurality of securing straps 418.

Figure 12:
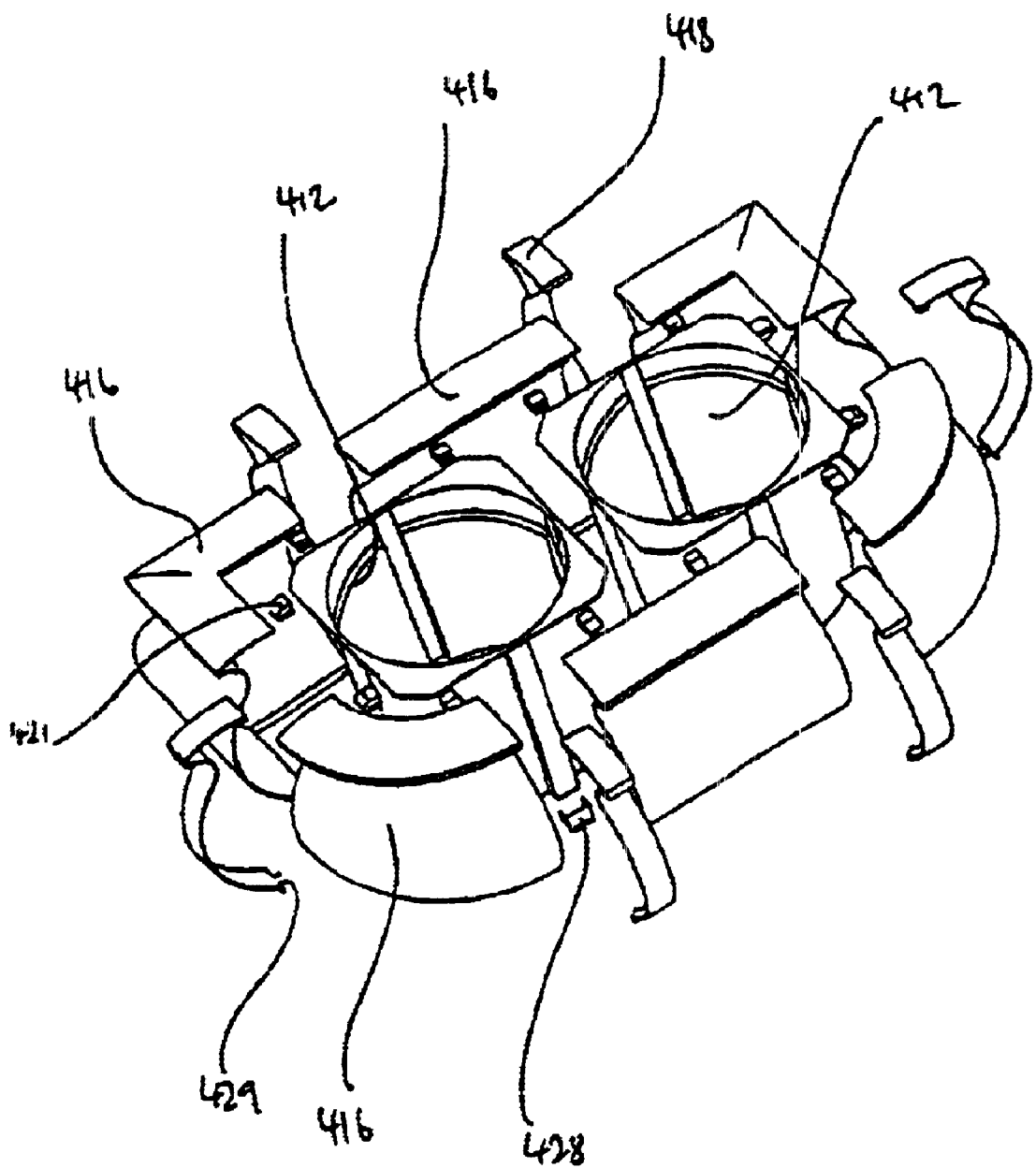
FIG. 12 is an exploded view of the apparatus of FIG. 11.

FIG. 12 is an exploded view of the embodiment of FIG. 11 from which there are seen a plurality of C-section extrusion portion 421 similar in nature to those illustrated in the embodiment of FIG. 7.

The lower region of each of the joggled profiles of each plant pot 412 of this embodiment is arranged to receive an anchor member 428 having a lozenge shaped aperture therein and which is arranged to receive securing means 429 associated with the lower portion of each securing strap 418. As illustrated, the securing means 429 comprise securing pins.

Figure 13:
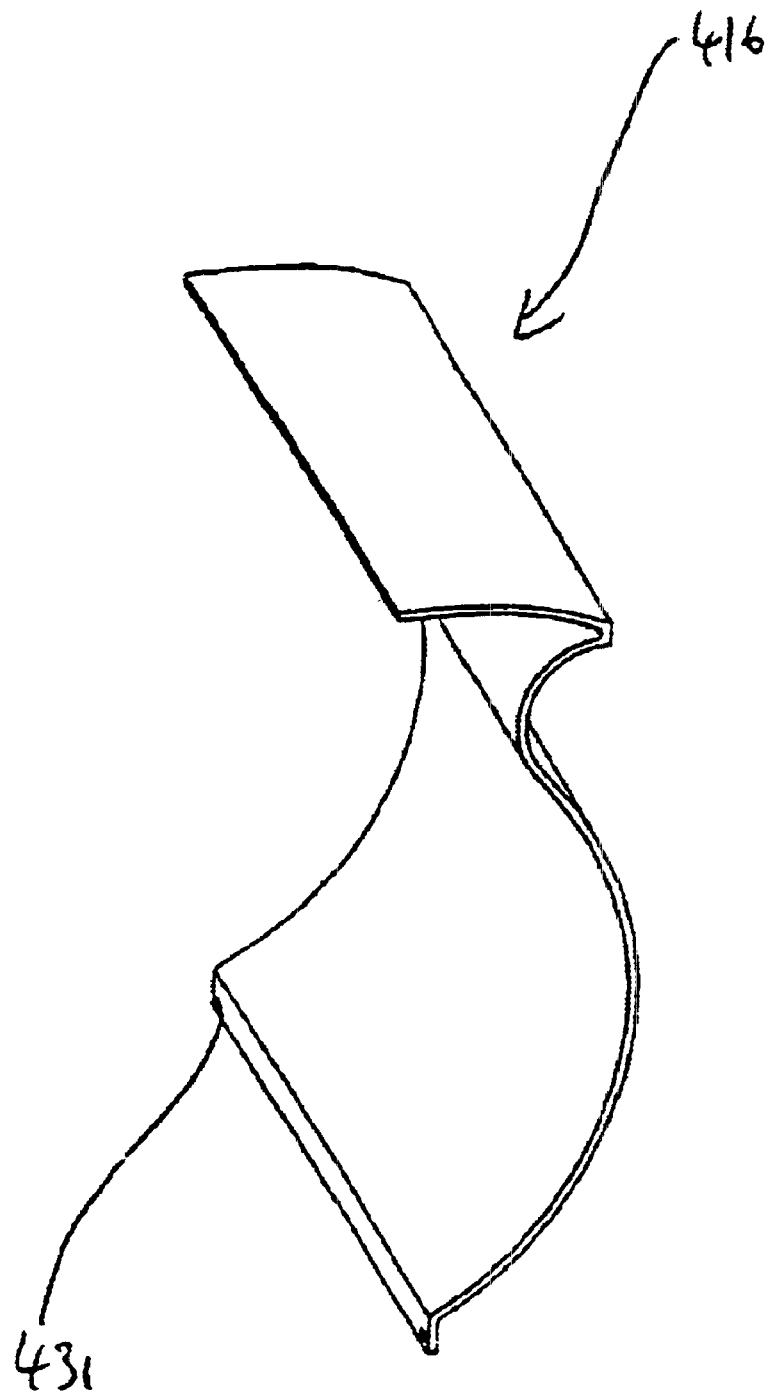
FIG. 13 is a perspective view of a straight panel member for use in the embodiment of FIG. 11.
Figure 14:
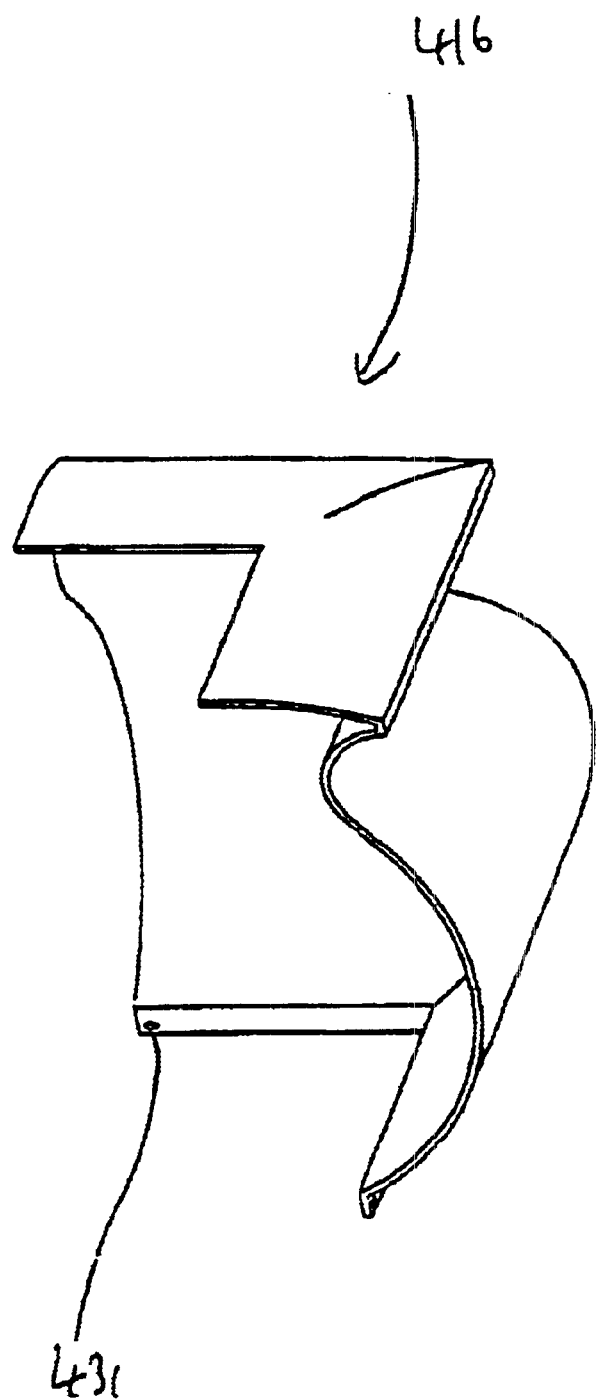
FIG. 14 is a perspective view of a corner panel member for use in the embodiment of FIG. 11.
Figure 15:
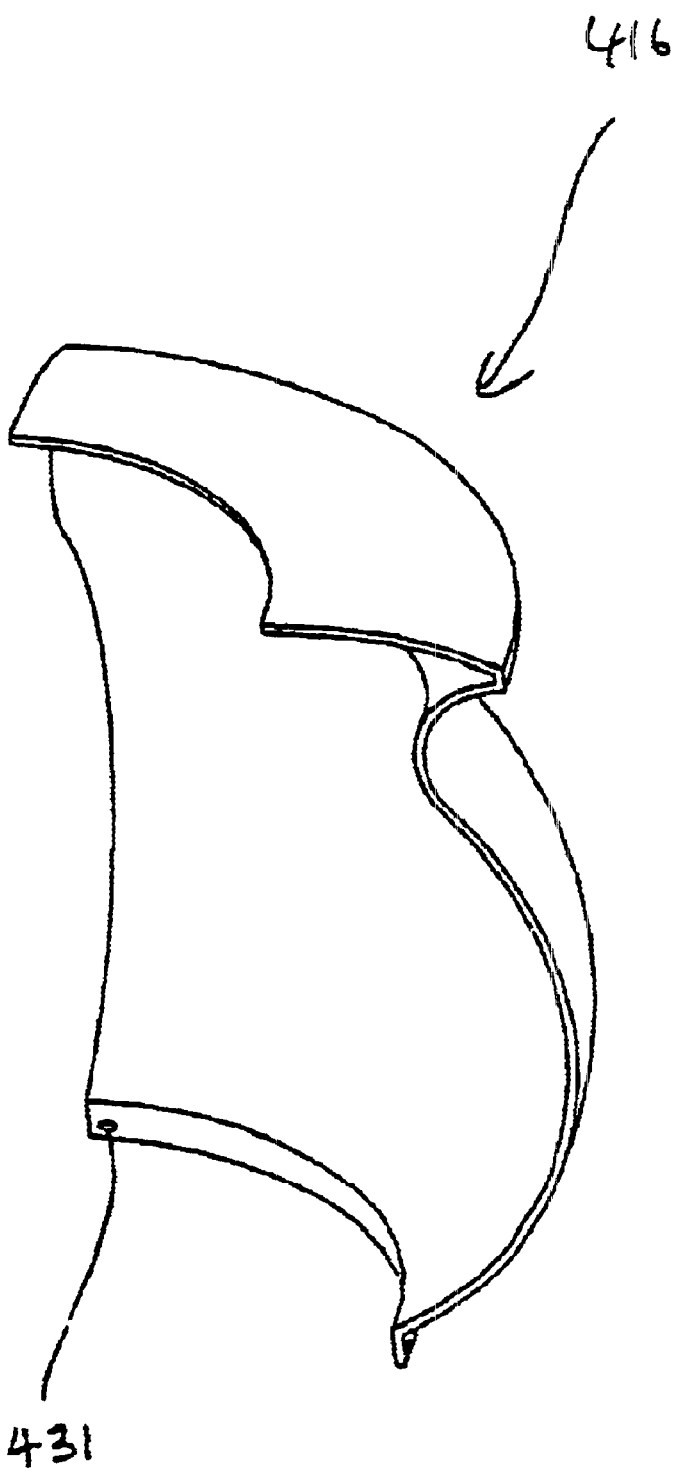
FIG. 15 is a perspective view of a quarter-circle panel for use in the embodiment of FIG. 11.

FIGS. 13, 14 and 15 are perspective views of different forms of panels 416 as employed within the embodiment of FIGS. 11 and 12. As will be appreciated, FIG. 13 is a view of a straight panel member, FIG. 14 is a perspective view of a corner panel member and FIG. 15 is a perspective view of a quarter-circle panel member.

Each of the panel members 416 of FIGS. 13–15 include a lower edge region in which apertures 431 are provided for receiving the pins 429 which then pass into the lozenge shaped aperture of each retaining anchor member 428. In this manner, the lower portion of each securing strap 418 secures the lower region of each panel member 416 to the plant pot.

It should of course be appreciated that further forms of panel members can be provided in accordance with the potential shape and dimensions and overall form, of the cover arrangement required. Also, the particular forms of panels illustrated in FIGS. 13–15 can be employed in any one of the other embodiments illustrated by way of the accompanying drawings.

Figure 16:
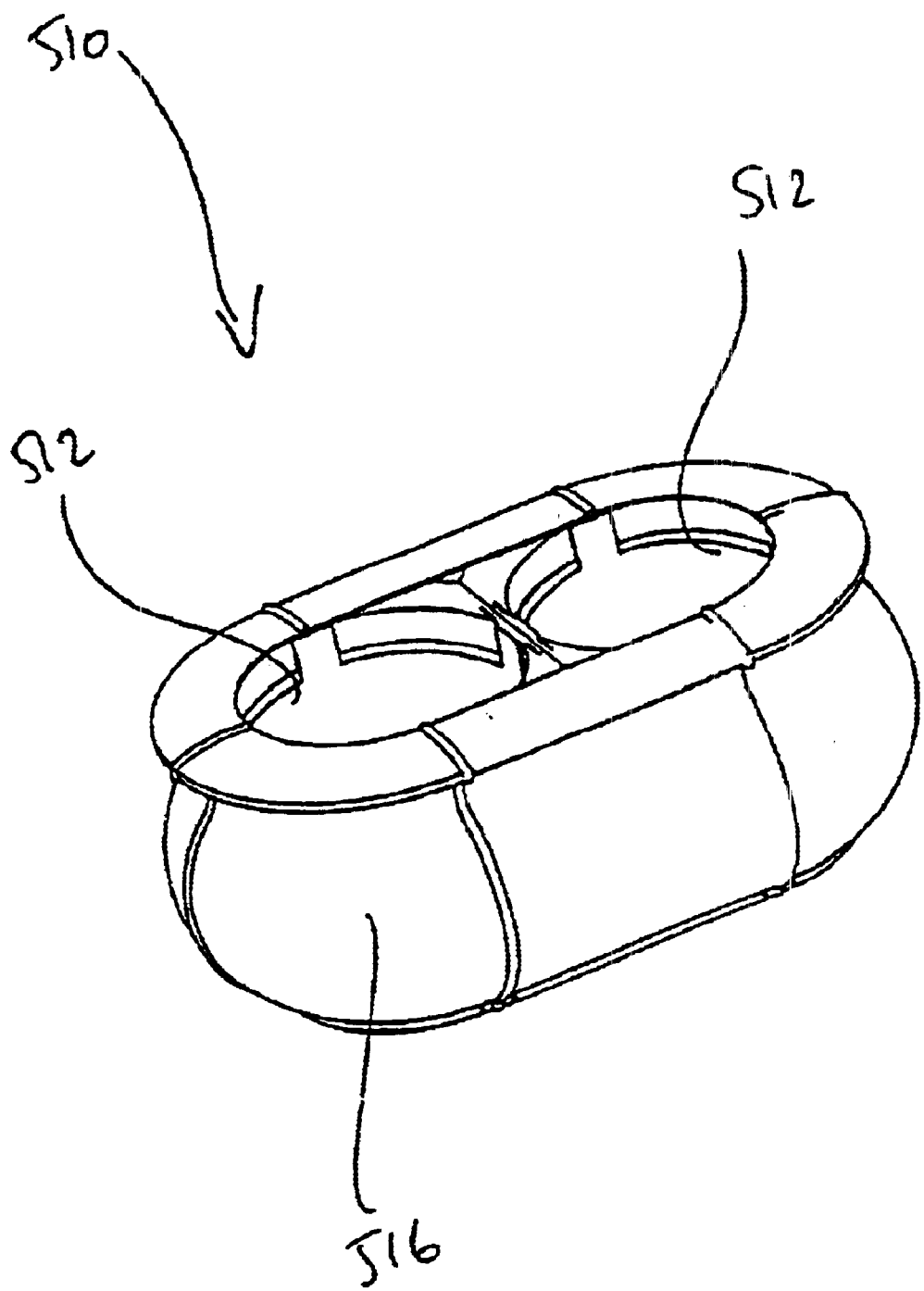
FIG. 16 is a perspective view of the fifth embodiment of the present invention.
Figure 17:
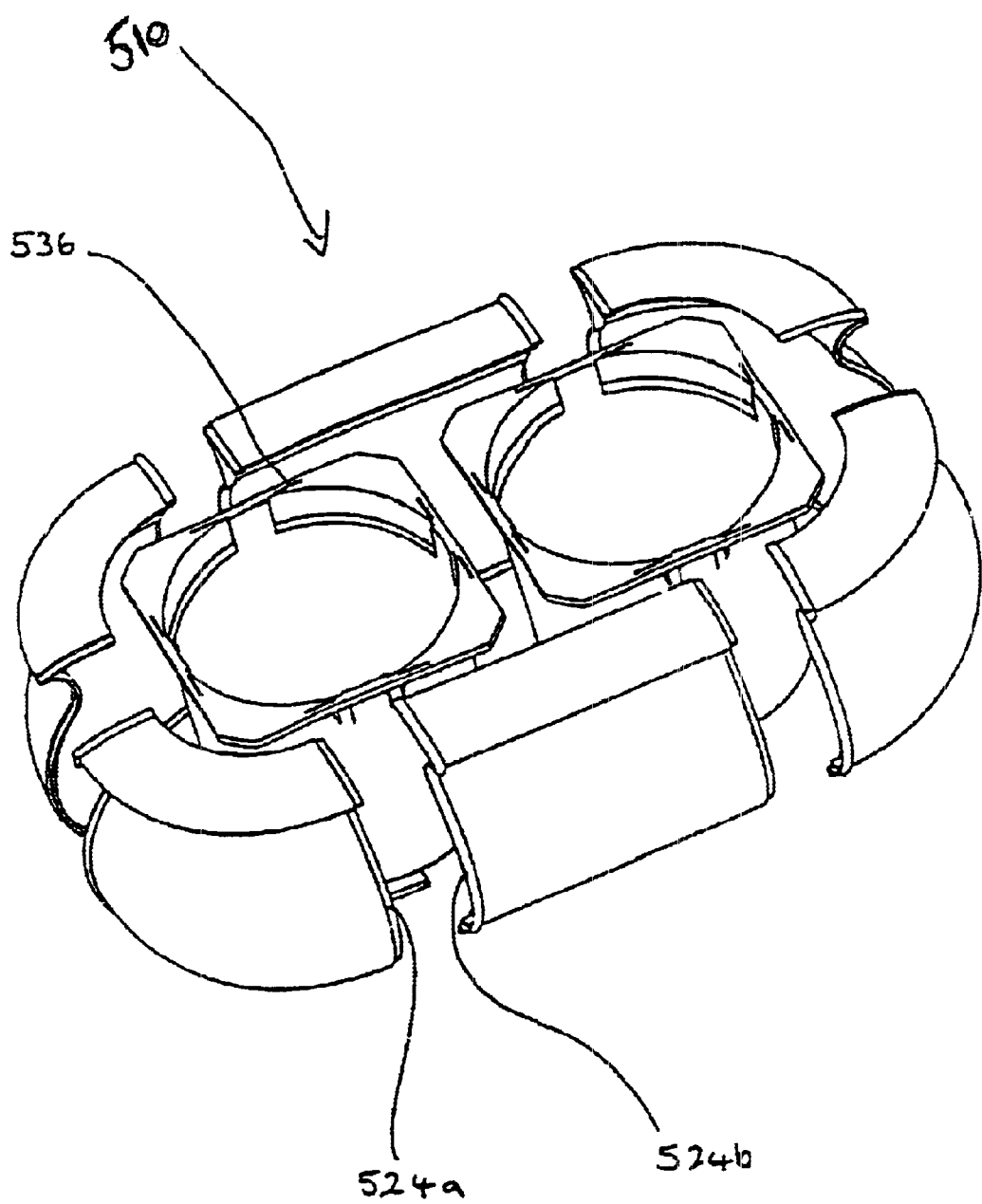
FIG. 17 is an exploded view of the apparatus of FIG. 16.

FIGS. 16 and 17 are a perspective and exploded view of one final embodiment of the present invention comprising a plant containing apparatus 510 including two plant pots 512 and a plurality of panels 516. The underside of the upper portion of each panel is provided with a downwardly depending lug (not shown) which is arranged to be received within a slot 536 formed within an upper flange of each of the pots 512. The lower surface of each of the panels 516 is also provided with appropriate engagement formations so as to engage with the lower region, or under side, of each pot. One side of each panel 516 is generally formed with either a joggled profile 524a or a beading profile 524b which, when the panels 516 are in situ around the plant pots 512 the joggled profile 524a and the beading profile 524b interengage so as to at least partially disguise the join between adjacent panels 516 and as illustrated in FIG. 16.

Figure 18:
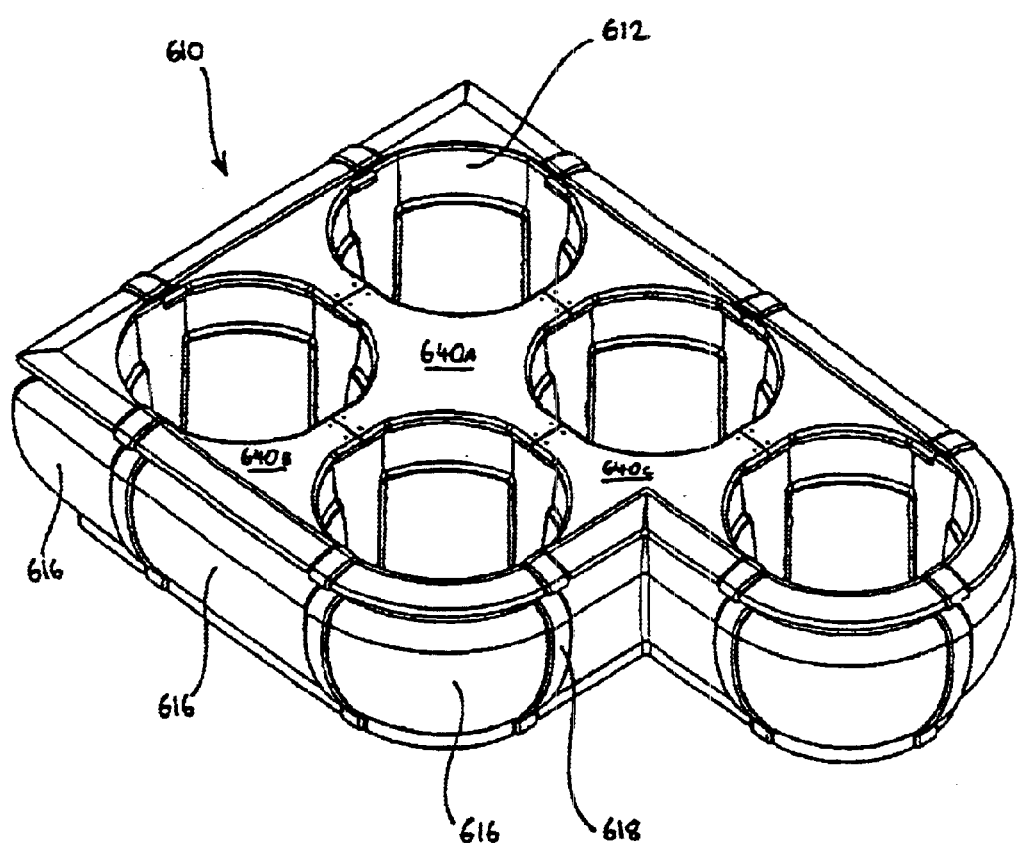
FIG. 18 is a perspective view of a plant container apparatus arrangement in accordance with a sixth embodiment of the present invention.

A particularly preferred embodiment is illustrated with reference to FIGS. 18–28 in which FIG. 18 illustrates the completely assembled plant container arrangement.

The arrangement 610 includes five plant pots 612 with a modular surround formed by various side panel members 616 which, as will be described later, are secured by means of fasteners such as screws (not shown) to the upper end regions of the plant pots 612. The fasteners are located at adjacent upper and lower portions of the edge regions of the side panels 616. Once secured by the fasteners to the plant pots 612, the join between adjacent side panel members 616, and indeed the presence of the fasteners, is hidden or disguised by use of elongate strap member 618 which, again as will be described later, are arranged for a press-fit against adjacent edge regions of adjacent side panels 616.

In view of the circular shape of the plant pots 612, when located in the arrangement shown in FIG. 18, gaps and open spaces inherently arise between the plant pots 612 and the embodiment illustrated in FIG. 18 advantageously employs a selection of cover plates 640 having, in the embodiment of FIG. 18, the different forms illustrated by cover plates 640A, 640B and 640C. The positioning of the cover plates 640 as illustrated in FIG. 18 advantageously serve to prevent the ingress of water, soil or any undesired foreign bodies into the spaces found between the plant pots 612 and can also provide further, for example, structural, advantages. That is, during formation of the arrangement such as that illustrated in FIG. 18, and prior to attachment of the side panels 616 and subsequent attachment of the elongate straps 618, the cover plates 640 can be arranged to be engaged with the upper rim regions of the plant pots 612 so as to accurately locate the plant pot 612 in their illustrated relative positions for subsequent attachment of the side panel members 616. Fastening means such as screws (not shown) can likewise be provided to secure the cover plates 640 to the upper rim regions of the plant pots 612 as will be described later.

Figure 19:
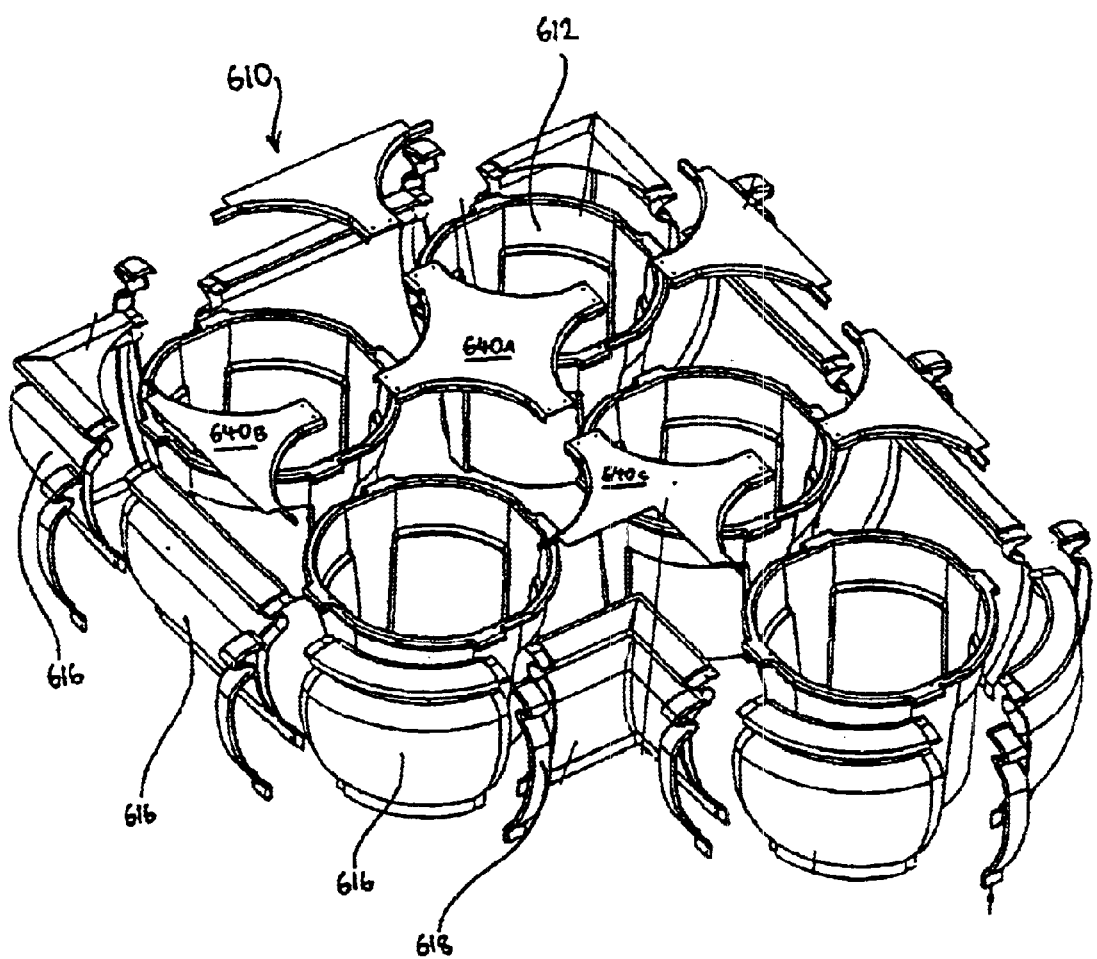
FIG. 19 is an exploded view of the embodiment of FIG. 18.

Turning now to FIG. 19, there is illustrated an exploded view of the arrangement of FIG. 18 which more clearly shows the exact form of the various side panel members 616 and cover plate members 610 of the FIG. 18 embodiment.

Figure 20A:
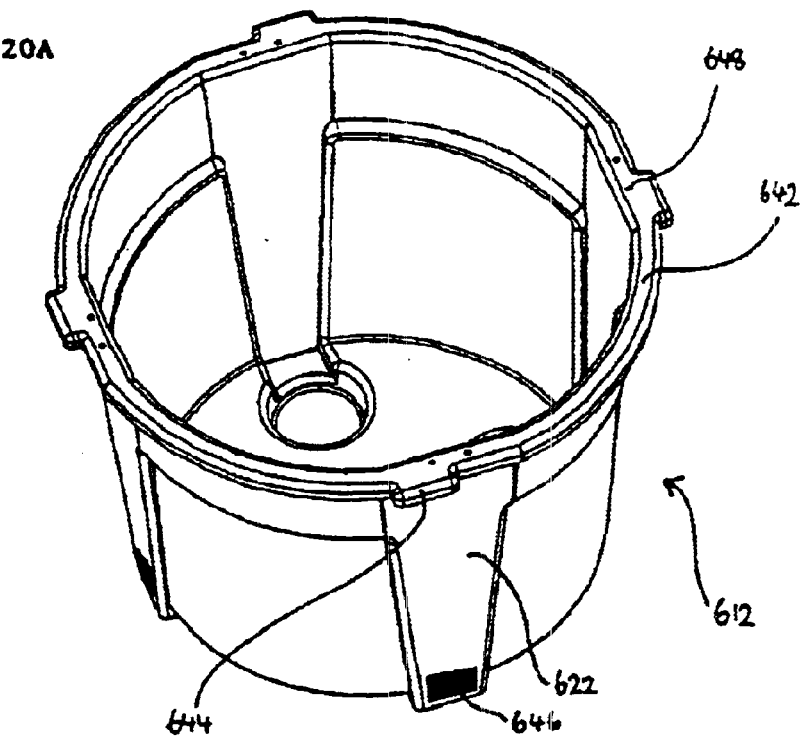
FIGS. 20A and 20B are lower perspective views respectively of plant pots of the sixth embodiment.
Figure 20B:
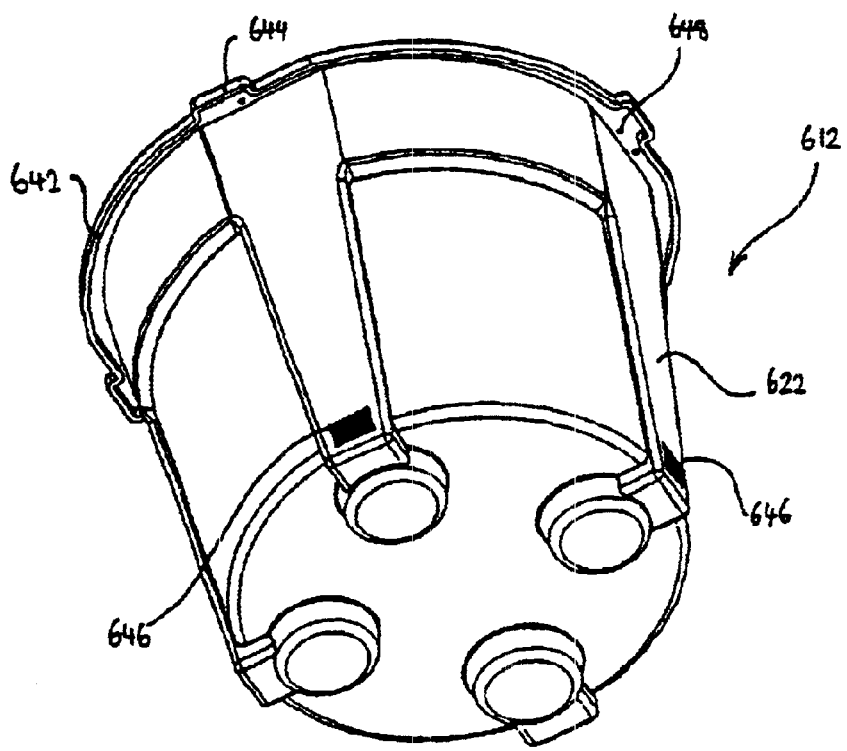

FIGS. 20A and 20B illustrate an example of the plant pot 612 of the FIG. 18 embodiment which comprise a generally circular plant pot 612 having four joggled profiles 622 forming spines down the outside of the pot and wherein the pot 612 is provided with an upper lip portion 642 which, at locations aligned with the joggled profile 622 include lip extension portions 644. Associated with each of the lip extension portions 644 is a pair of apertures 648 which are arranged to receive the fasteners, such as the screws (not shown) serving to secure the side panel 616, or the cover plate member 640, thereto.

With particular reference to FIG. 20A, it will be appreciated that each lip extension portion 644 is slightly offset to the left of the longitudinal centre line of each joggled formation 622 and this allows adjacent plant pots 612 to inter-engage as illustrated with reference to FIG. 19.

Figure 21A:
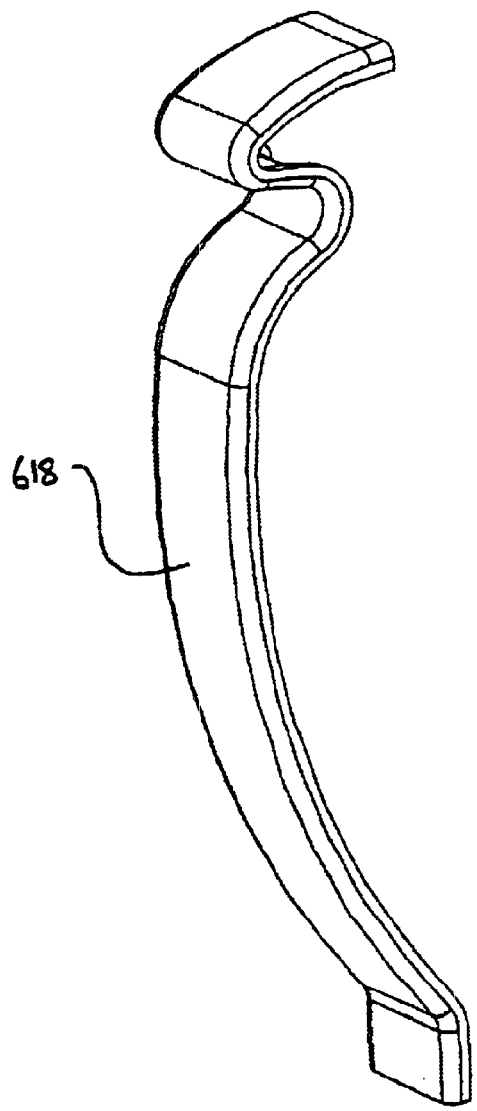
FIGS. 21A and 21B are respective side perspective views of the strap members of the sixth embodiment.
Figure 21B:
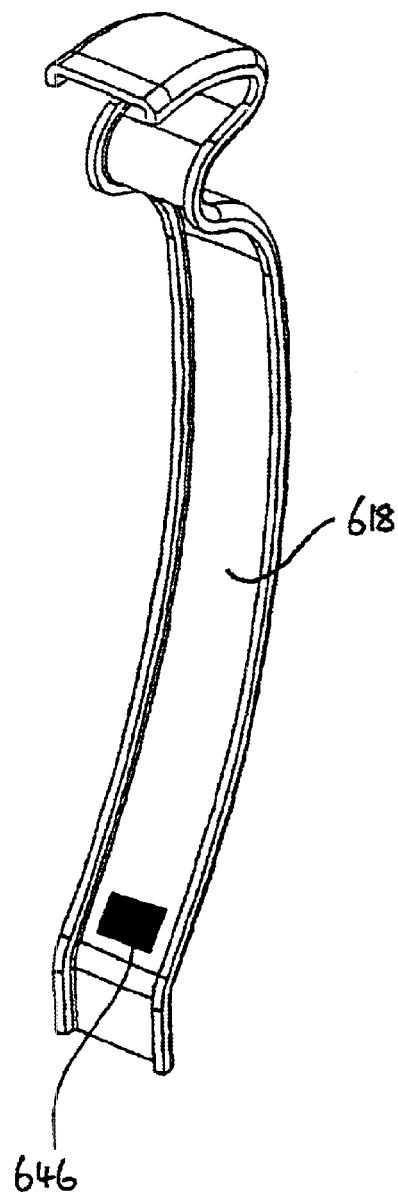

Turning now to FIGS. 21A and 21B there are illustrated perspective views of the vertical strap member 618 of the FIG. 18 embodiment. As will be appreciated, the vertical strap member 618 is configured so as to match the outer contour of the panel members 616 and, towards its base region, is provided with an appropriate press-fit formation 646, such as a grip-strip formation or hook-and-eye fastener formation which is arranged for engagement with similar formations as provided at edge flanges 624 of the panel members 616 as illustrated in FIGS. 22–25. The edge flange region 624 of each of the panels 616 also exhibits a press-fit formation 646 at the upper region thereof and this is arranged to engage with a further press-fit formation 646 on the under side of the upper region of the strap member 618 which is not visible in FIGS. 21A and 21B. As will be appreciated, the side panels 616 of FIGS. 22 and 23 comprise right angled corner panel members and the panel member 616 of FIG. 24 comprises a quarter circle panel member whereas FIG. 25 illustrates a flat panel member. As will be appreciated with reference to each of the different versions of panel member 616, the upper region of the side flange 624 is provided with an aperture 650 which is arranged to be aligned with a respective one of the apertures 648 associated with the lip extension portion 644 of the lip 642 of each plant pot 612. In this manner, a fastener member (not shown) is then arranged to pass through the two aligned apertures 648, 650 so as to secure the side panels 616 to the plant pots 612.

Figure 26:
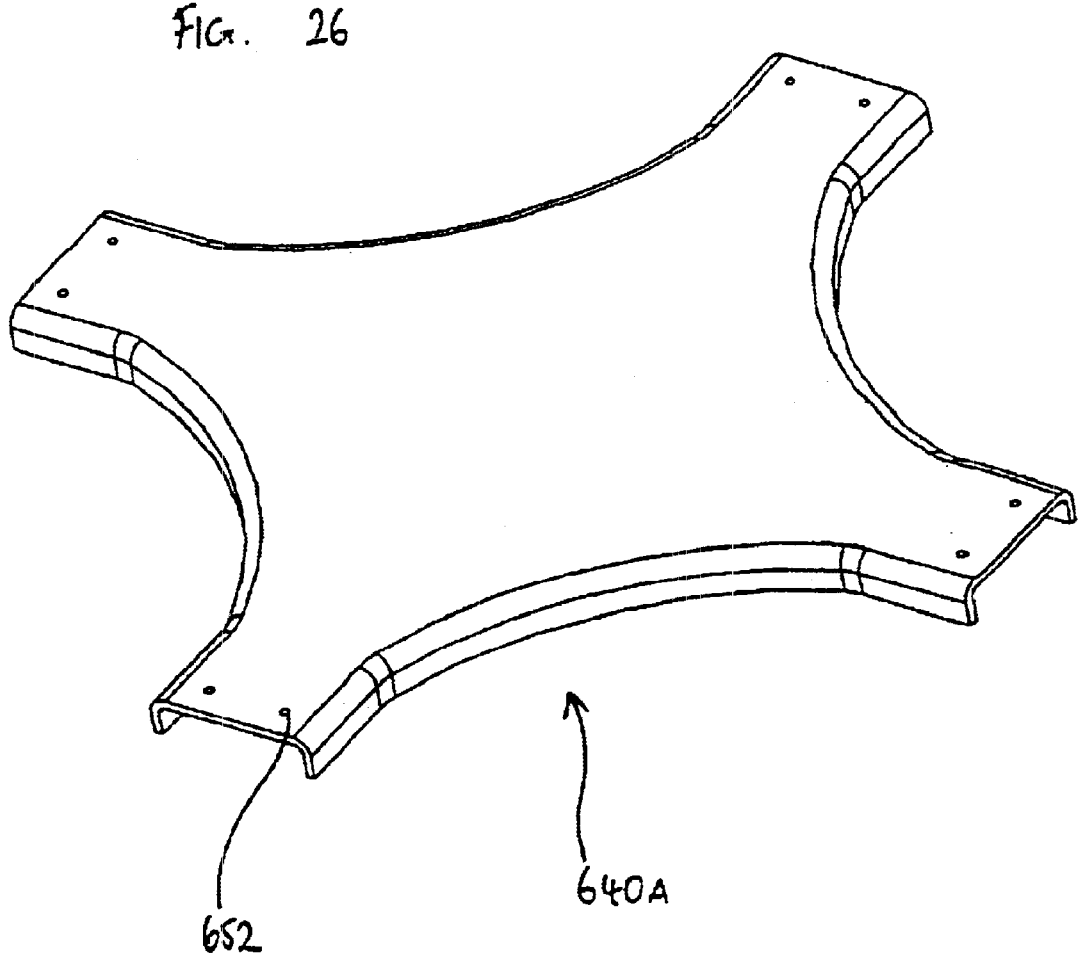
Figure 27:
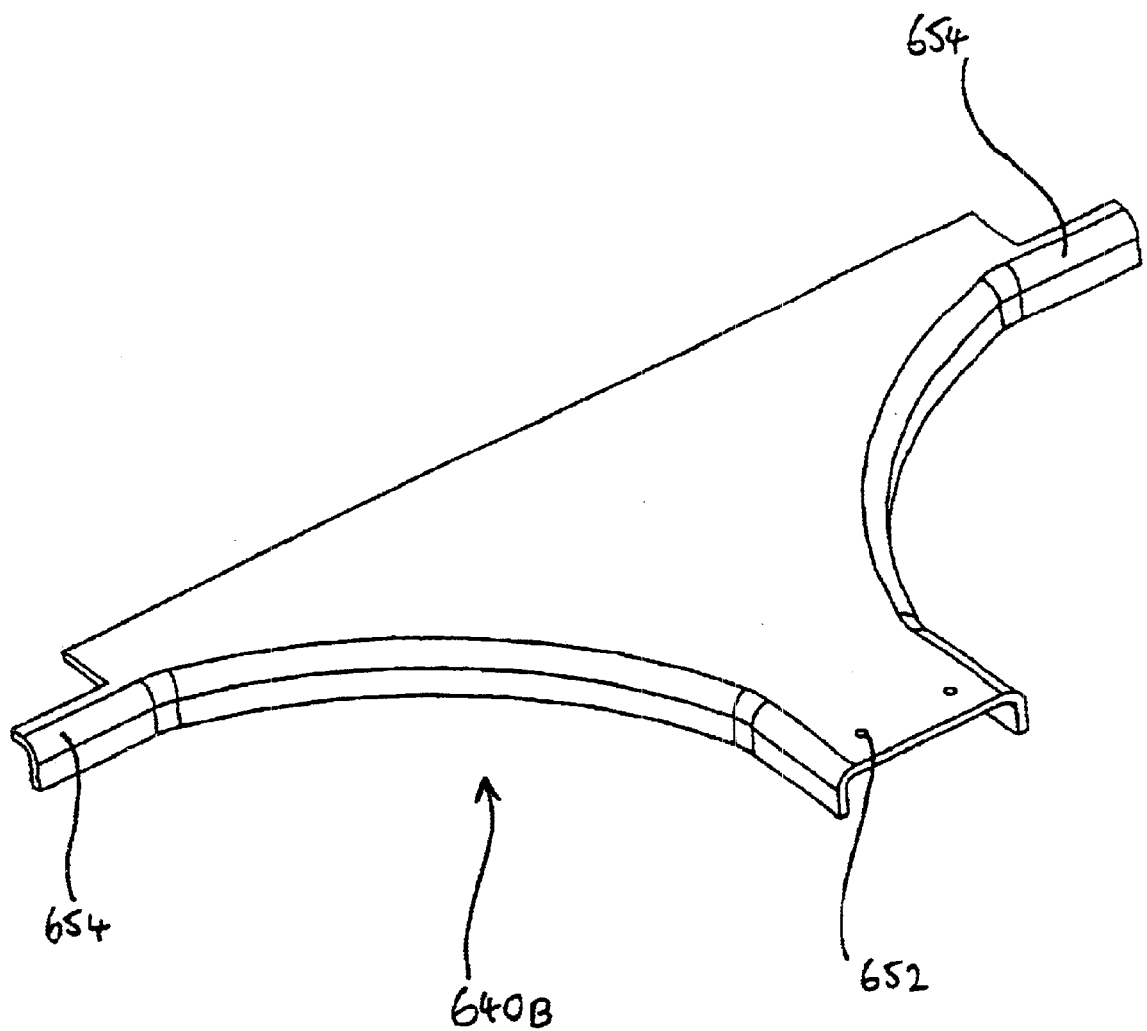

Turning now to FIGS. 26–28, there are illustrated the different forms 64A, 64B and 64C of the cover plates of the FIG. 18 embodiment and which show apertures 652 arranged for receipt of the fastener means (not shown) serving to secure the cover plate 640 to the upper lip 642 regions of the plant pots 612. The cover plate 64B and 64C as illustrated in FIGS. 27 and 28 terminate with finger extensions 654 arranged such that the cover plate 640 does not interfere with the engagement of the side panels 616 to the plant pot 612.

As will be appreciated, the embodiment of FIG. 18 advantageously employs a wide variety of side panel members so as to allow for any particular configuration of plant pot arrangement and further employs the elongate strap members as a means for enhancing the overall appearance of the arrangement by hiding or disguising the join between adjacent panel members 616 and the existence of a particular chosen fastening means for fixing the side panels 616 to the plant pots.

As will be appreciated from the foregoing description, a plant containing apparatus in any particular form and overall dimension can readily be built-up by means of any required number of plant pots and an appropriate number, and variety, of panel members.

A large plant display can therefore be built-up using a plurality of separate pots which nevertheless gives an overall appearance of a single plant container by use of the at least partial covering arrangement of the present invention. Use of a plurality of separate pots within the apparatus of the present invention also proves advantageous in that the planting arrangement can be modified quite readily and maintenance is made much simpler. For example, if one particular plant needs replacement for whatever reason, it will only be necessary to access and remove the actual pot containing that plant and so it will not be necessary to disturb the whole display.

Also, since the apparatus can be made up of a plurality of separate elements, it is only ever necessary to carry one element at a time to its final display destination and this can prove quite advantageous where an elaborate or wide-area display is required at a relatively inaccessible interior location.

The present invention therefore provides for the provision of such elaborate displays but within a cover arrangement which is readily adjustable and reconfigurable and which provides for the appearance of a single container.

Also, whichever panel engagement arrangement features are actually chosen, a wide variety of different formats and styles of container can be provided by use of various panels of differing forms so long as they all share the same engagement features.

Of course, once a particular size of container apparatus has been achieved, the display can be further enhanced by non-plant features such as water features etc.

It is a particular advantage of the present invention that the overall weight of the plant pots once filled with the appropriate display plants and soil serves to afford the overall container apparatus, including the cover arrangement, a certain degree of security and integrity.

Yet further, cover plates can readily be incorporated into the apparatus so as to block off any gaps that might appear between the upper portions of each panel and the outer edges of each plot so as to prevent the ingress of soil or other particles into the regions between each panel and the adjacent side wall of the pot.

It will of course be appreciated that the invention is not restricted to the details of the foregoing embodiments since any appropriate features from one embodiment can be used to replace the corresponding features in any other of the illustrated embodiments and the cover arrangement need not extend all the way around the pots forming the container arrangement. Indeed, any number, or pattern, of plant pots can be covered by way of the covering arrangement of the present invention and indeed the covering arrangement can be provided merely for a single pot. For such a requirement, it is envisaged that two half-circle panel members will be provided.

Also, the panels and the securing members, for example the straps, can be formed from any appropriate material and of any appropriate shape and dimensions. For example, the panels can be formed of any appropriate material such as a plastic, wood, wicker and even from meshes such as wrought iron mesh. Thus, the panel need not comprise a solid panel.

Further, the engagement between the panels, and between the panels and the plant container, need not be achieved via the side edges and can be effected via any appropriate location on the panel.

Also, the engagement formations required to keep the panels in position can be provided in association with, and for example in engagement with, support members such as the feet described above. The weight of the plant and plant container can then serve to secure the panels in position. For example, the part-spherical depressions described above could comprise such engagement formations.

Also, it will be appreciated that a wide variety of connection arrangements can be employed for the panels and securing members. For example, where reference is made to, part of the modular arrangement requiring a male connector member, the engagement arrangement could quite readily be reversed such that a female formation is provided.

What is claimed is:

1. An arrangement for at least partially covering plant containing means to thereby at least partially surround said containing means, comprising:
   a modular arrangement including a plurality of panel members; and
   means for securing said plurality of panel members relative to each other so as to provide for said at least partial covering of the containing means,
   said means for securing including an elongate strap member for attachment to the arrangement in the region of a joint formed between adjacent panel members,
   wherein said means for securing comprise fastening means arranged to engage both said panel members and said plant containing means, and
   said panel members and said plant containing means have apertures arranged to be aligned and for receipt of said fastening means.

2. An arrangement as claimed in claim 1, wherein the fastener means are arranged to be located at side edge regions of said panel members.

3. An arrangement as claimed in claim 1, wherein said plant containing means has an upper portion arranged to present an outwardly extending lip portion at which said fastening means is to be located.

4. An arrangement as claimed in claim 3, wherein said lip portions are arranged to inter-engage when more than one plant containing means is to be used within the arrangement.

5. An arrangement as claimed in claim 3 and arranged such that a pair of fasteners are to be located on each lip portion, each of said pair of fasteners being provided for the fastening of adjacent panel members.

6. An arrangement as claimed in claim 1, wherein the means for securing said panels comprises a securing member arranged to connect to adjacent panel members.

7. An arrangement as claimed in claim 6, wherein the securing member is arranged for a clip or press fit as to secure said panel members.

8. An arrangement for at least partially covering plant containing means to thereby at least partially surround said containing means, comprising:
   a modular arrangement including a plurality of panel members; and
   means for securing said plurality of panel members relative to each other so as to provide for said at least partial covering of the containing means,
   said means for securing including an elongate strap member for attachment to the arrangement in the region of a joint formed between adjacent panel members, said elongate strap member having a longitudinal axis extending substantially parallel to the joint formed between adjacent panel members over which the strap member is placed,
   wherein said means for securing comprise fastening means arranged to engage both-said panel members and said plant containing means.

9. An arrangement as claimed in claim 8, wherein said plurality of panel members comprise at least two or more of a straight panel portion, a corner panel portion, a half circle panel portion or a quarter circle panel portion.

10. An arrangement as claimed in claim 8, wherein said plurality of panel members exhibit a decorative profile.

11. An arrangement as claimed in claim 8, wherein said plurality of panel members include engagement formations.

12. An arrangement as claimed in claim 8, and arranged to at least partially cover a plurality of plant containers.

13. An arrangement for at least partially covering plant containing means to thereby at least partially surround said containing means, comprising:
   a modular arrangement including a plurality of panel members;
   means for securing said plurality of panel members relative to each other so as to provide for said at least partial covering of the containing means,
   said means for securing including an elongate strap member for attachment to the arrangement in the region of a joint formed between adjacent panel members; and
   means for securing said plurality of panel members to the plant containing means, wherein
      said plurality of panels are arranged to present said means for securing said panels to the plant containing means,
      said plurality of panel members include male connector members, and
      said means for securing said plurality of panels to the container are provided in the regions of the top and bottom of the panels.

14. An arrangement as claimed in claim 13, and including hook and eye fastener means so as to provide for a temporary location of said plurality of panels relative to the plant containing means.

15. An arrangement as claimed in claim 13, wherein the means for securing said plurality of panels to the plant containing means comprises an upper region and said elongate strap member.

16. An arrangement as claimed in claim 15, wherein the two ends of the strap member are arranged for engagement with an upper and lower portion of the plant containing means respectively.

17. An arrangement as claimed in claim 16, wherein the strap member is arranged for connection to a foot portion for the plant containing means.

18. An arrangement as claimed in claim 15, wherein the strap member is arranged so that at least one end thereof serves to clip the strap member into place.

19. An arrangement as claimed in claim 15, wherein the strap member is arranged for use in association with a fastener means.

20. An arrangement for at least partially covering plant containing means to thereby at least partially surround said containing means, comprising:
   a modular arrangement including a plurality of panel members;
   means for securing said plurality of panel members relative to each other so as to provide for said at least partial covering of the containing means,
   said means for securing including an elongate strap member for attachment to the arrangement in the region of a joint formed between adjacent panel members;
   means for securing said plurality of panel members to the plant containing means,
   wherein the means for securing said panels relative to each other also comprises said means for securing said panels to the plant containing means; and
   and a strap member for connection to both said panel members and the plant containing means,
   wherein said strap member is arranged for press-fit engagement with both said plurality of panels and the plant containing means.

21. A plant containing means cover formed of an arrangement for at least partially covering plant containing means to thereby at least partially surround said containing means, comprising:

a modular arrangement including a plurality of panel members;

means for securing said plurality of panel, members relative to each other so as to provide for said at least partial covering of the containing means;

said means for securing including an elongate strap member for attachment to the arrangement in the region of a joint formed between adjacent panel members, said elongate strap member having a longitudinal axis extending substantially parallel to the joint formed between adjacent panel members over which the strap member is placed, wherein said plant containing means includes at least one plant container, and said at least one plant container includes a joggled profile at an upper rim thereof.

22. The plant container apparatus as claimed in claim 21, wherein a portion of the rim of the plant container forming the joggled profile comprises an engagement formation for the securing of said plurality of panel members to the at least one plant container.

23. The plant container apparatus as claimed in claim 21, wherein the region forming the joggled profile serves to locate said plurality of panels relative to the at least one plant container.

24. The plant container apparatus as claimed in claim 21, wherein said joggled profile extends down the side of the at least one said container.

25. The plant container apparatus as claimed in claim 21, and including a plurality of foot members upon which the plant container is to be located and arranged for engagement with a portion of the container defining the joggled profile so as to assist in the location of said feet.

\* \* \* \* \*

UNITED STATES PATENT AND TRADEMARK OFFICE
CERTIFICATE OF CORRECTION

PATENT NO.    : 6,625,929 B1
DATED         : September 30, 2003
INVENTOR(S)   : Trevor Lawson et al.

It is certified that error appears in the above-identified patent and that said Letters Patent is hereby corrected as shown below:

<u>Title page,</u>
Item [22], to read as follows:
-- [22]   PCT Filed:     Nov. 24, 1999 --.

Signed and Sealed this

Tenth Day of February, 2004

JON W. DUDAS
*Acting Director of the United States Patent and Trademark Office*